US010623581B2

(12) United States Patent
Rao et al.

(10) Patent No.: US 10,623,581 B2
(45) Date of Patent: Apr. 14, 2020

(54) ADAPTIVE, MULTI-MODAL FRAUD DETECTION SYSTEM

(71) Applicant: Vail Systems, Inc., Deerfield, IL (US)

(72) Inventors: Srinivasa Rao, Schaumburg, IL (US); Todd Whiteley, Lake Forest, IL (US)

(73) Assignee: VAIL SYSTEMS, INC., Deerfield, IL (US)

( * ) Notice: Subject to any disclaimer, the term of this patent is extended or adjusted under 35 U.S.C. 154(b) by 173 days.

(21) Appl. No.: 15/658,994

(22) Filed: Jul. 25, 2017

(65) Prior Publication Data
US 2019/0037081 A1 Jan. 31, 2019

(51) Int. Cl.
| H04M 7/00 | (2006.01) |
| H04M 3/51 | (2006.01) |
| H04L 29/08 | (2006.01) |
| H04L 12/24 | (2006.01) |
| H04L 12/26 | (2006.01) |
| H04M 15/00 | (2006.01) |

(Continued)

(52) U.S. Cl.
CPC ...... *H04M 7/0078* (2013.01); *H04L 41/0273* (2013.01); *H04L 41/08* (2013.01); *H04L 41/16* (2013.01); *H04L 43/067* (2013.01); *H04L 67/08* (2013.01); *H04M 3/5175* (2013.01); *H04M 15/41* (2013.01); *H04M 15/47* (2013.01); *H04M 15/58* (2013.01); *H04M 15/852* (2013.01); *G10L 15/1807* (2013.01); *H04L 43/0817* (2013.01); *H04M 3/2281* (2013.01); *H04M 3/5166* (2013.01); *H04M 2201/41* (2013.01); *H04M 2203/551* (2013.01); *H04M 2203/556* (2013.01); *H04M 2203/6027* (2013.01); *H04M 2203/6054* (2013.01); *H04M 2215/0148* (2013.01)

(58) Field of Classification Search
CPC .......... G06F 21/32; H04M 2203/6027; H04M 3/42221; H04M 7/0078; H04M 3/5175; H04M 15/852; H04M 15/58; H04M 15/41; H04M 15/47; H04M 2215/0148; H04M 2201/41; H04M 2203/6054; H04M 2203/551; H04M 2203/556; H04M 3/2281; H04M 3/5166; H04L 67/08; H04L 41/0273; H04L 41/16; H04L 41/08; H04L 43/067; H04L 43/0817; G10L 15/1807
See application file for complete search history.

(56) References Cited

U.S. PATENT DOCUMENTS

| 6,256,606 B1 | 7/2001 | Thyssen et al. |
| 7,171,355 B1 | 1/2007 | Chen |
| 7,251,241 B1 | 7/2007 | Jagadeesan et al. |

(Continued)

FOREIGN PATENT DOCUMENTS

| AU | 2011276467 B2 | 1/2012 |
| AU | 2011276467 | 4/2015 |

(Continued)

*Primary Examiner* — Lisa Hashem
(74) *Attorney, Agent, or Firm* — Leason Ellis LLP

(57) ABSTRACT

A system and method for fraud detection and management are provided. The system includes a first communication device that receives a phone call from a second communication device, wherein a call flow of the phone call comprises one or more distinct phases. The system also includes a fraud detection and management system (FDMS) platform that determines whether the phone call exceeds a predetermined risk threshold at each distinct phase of the call flow.

20 Claims, 11 Drawing Sheets

(51) Int. Cl.
*H04M 3/22* (2006.01)
*G10L 15/18* (2013.01)

(56) References Cited

U.S. PATENT DOCUMENTS

| | | | |
|---|---|---|---|
| 7,912,192 B2 | 3/2011 | Kealy et al. | |
| 7,925,304 B1 | 4/2011 | Gailloux et al. | |
| 8,073,691 B2 | 12/2011 | Rajakumar | |
| 8,094,800 B1 | 1/2012 | Smith et al. | |
| 8,238,532 B1 | 8/2012 | Cox et al. | |
| 8,311,826 B2 | 11/2012 | Rajakumar | |
| 8,510,215 B2 | 8/2013 | Gutierrez et al. | |
| 8,666,841 B1* | 3/2014 | Claridge | G06Q 20/4016 705/26.35 |
| 8,793,131 B2 | 7/2014 | Guerra et al. | |
| 8,897,437 B1 | 11/2014 | Tan et al. | |
| 8,903,859 B2 | 12/2014 | Zeppenfeld et al. | |
| 8,924,285 B2 | 12/2014 | Rajakumar et al. | |
| 8,930,261 B2 | 1/2015 | Hartig et al. | |
| 9,001,985 B2 | 4/2015 | Cox et al. | |
| 9,031,838 B1 | 5/2015 | Nash et al. | |
| 9,037,113 B2 | 5/2015 | Balasubramaniyan et al. | |
| 9,113,001 B2 | 8/2015 | Rajakumar et al. | |
| 9,203,962 B2 | 12/2015 | Guerra et al. | |
| 9,264,536 B1 | 2/2016 | Saitawdekar et al. | |
| 9,264,539 B2 | 2/2016 | Lin | |
| 9,503,571 B2 | 11/2016 | Guerra et al. | |
| 9,516,497 B2 | 12/2016 | Balasubramaniyan et al. | |
| 9,552,417 B2 | 1/2017 | Olligschlaeger et al. | |
| 9,571,652 B1 | 2/2017 | Zeppenfeld et al. | |
| 9,762,728 B1 | 9/2017 | Cox et al. | |
| 9,824,692 B1 | 11/2017 | Khoury et al. | |
| 9,871,913 B1 | 1/2018 | Saitawdekar et al. | |
| 9,883,040 B2 | 1/2018 | Strong et al. | |
| 9,930,186 B2 | 3/2018 | Bandyopadhyay et al. | |
| 2003/0054867 A1 | 3/2003 | Dowlat et al. | |
| 2003/0112941 A1 | 6/2003 | Brown et al. | |
| 2006/0248019 A1 | 11/2006 | Rajakumar | |
| 2006/0285665 A1* | 12/2006 | Wasserblat | G10L 17/26 379/114.14 |
| 2007/0025281 A1 | 2/2007 | McFarland et al. | |
| 2007/0081648 A1 | 4/2007 | Abramson et al. | |
| 2007/0124246 A1 | 5/2007 | Lawyer et al. | |
| 2007/0201625 A1 | 8/2007 | Martin et al. | |
| 2007/0263812 A1* | 11/2007 | Polozola | G06Q 20/04 379/144.02 |
| 2007/0280436 A1 | 12/2007 | Rajakumar | |
| 2007/0282613 A1 | 12/2007 | Diethorn | |
| 2008/0291894 A1 | 11/2008 | Chang et al. | |
| 2008/0300871 A1 | 12/2008 | Gilbert | |
| 2009/0063159 A1 | 3/2009 | Crockett | |
| 2009/0108854 A1 | 4/2009 | Agevik et al. | |
| 2009/0119106 A1 | 5/2009 | Rajakumar et al. | |
| 2009/0203365 A1 | 8/2009 | Lee et al. | |
| 2009/0221276 A1 | 9/2009 | Vander Veen et al. | |
| 2010/0105446 A1 | 4/2010 | Charlier et al. | |
| 2010/0228656 A1 | 9/2010 | Wasserblat et al. | |
| 2010/0303211 A1* | 12/2010 | Hartig | G06Q 20/24 379/1.01 |
| 2010/0305946 A1 | 12/2010 | Gutierrez et al. | |
| 2011/0028168 A1 | 2/2011 | Champlin et al. | |
| 2012/0099711 A1* | 4/2012 | Tully | H04M 3/2281 379/32.01 |
| 2012/0253805 A1* | 10/2012 | Rajakumar | H04M 15/47 704/236 |
| 2012/0263285 A1* | 10/2012 | Rajakumar | G10L 17/00 379/189 |
| 2013/0097303 A1 | 4/2013 | Gichana et al. | |
| 2013/0253919 A1 | 9/2013 | Gutierrez et al. | |
| 2013/0290136 A1* | 10/2013 | Sheets | G06Q 30/0609 705/26.35 |
| 2014/0044020 A1 | 2/2014 | Mikkelsen et al. | |
| 2015/0032624 A1 | 1/2015 | Claridge et al. | |
| 2015/0065087 A1* | 3/2015 | Cudak | H04W 12/08 455/411 |
| 2015/0089568 A1* | 3/2015 | Sprague | H04L 63/0876 726/1 |
| 2015/0095029 A1* | 4/2015 | Nardin | G10L 17/26 704/249 |
| 2015/0178736 A1 | 6/2015 | Hartig et al. | |
| 2015/0269946 A1* | 9/2015 | Jones | G10L 17/22 704/273 |
| 2015/0381801 A1 | 12/2015 | Rajakumar et al. | |
| 2016/0142534 A1 | 5/2016 | Guerra et al. | |
| 2017/0111506 A1* | 4/2017 | Strong | G06F 21/552 |
| 2017/0111515 A1 | 4/2017 | Bandyopadhyay et al. | |
| 2017/0126884 A1 | 5/2017 | Balasubramaniyan et al. | |
| 2017/0163817 A1 | 6/2017 | Ballai et al. | |
| 2017/0372725 A1 | 12/2017 | Khoury et al. | |
| 2018/0012227 A1* | 1/2018 | Tunnell | G06Q 20/40145 |
| 2018/0032612 A1* | 2/2018 | Kariman | G06F 16/686 |
| 2018/0041631 A1 | 2/2018 | Douglas | |
| 2018/0041638 A1 | 2/2018 | Gupta et al. | |
| 2018/0041823 A1 | 2/2018 | Gaubitch et al. | |
| 2018/0075849 A1 | 3/2018 | Khoury et al. | |
| 2018/0082689 A1 | 3/2018 | Khoury et al. | |
| 2018/0082691 A1 | 3/2018 | Khoury et al. | |
| 2018/0082692 A1 | 3/2018 | Khoury et al. | |
| 2019/0141183 A1* | 5/2019 | Chandrasekaran | H04M 3/436 |
| 2019/0205887 A1* | 7/2019 | Kimmel | G06F 21/32 |
| 2019/0347752 A1* | 11/2019 | McCurry | G06Q 50/265 |

FOREIGN PATENT DOCUMENTS

| | | |
|---|---|---|
| CA | 3001839 | 4/2017 |
| WO | 2012/006171 | 1/2012 |
| WO | 2012006171 A2 | 1/2012 |

* cited by examiner

ADAPTIVE, MULTI-MODAL FRAUD DETECTION SYSTEM

FIELD OF THE DISCLOSURE

The present disclosure relates to telephony systems and methods, and, more particularly to a fraud detection system that detects a fraudulent call, including a fraudulent call answered by a call center, and a method therefor.

BACKGROUND OF THE DISCLOSURE

Call center fraud has been growing at an alarming rate over the past few years. There are many reasons for this growth. Some of the main reasons for this growth include the increased robustness of web and mobile application security, and the introduction of chip cards by the credit card industry, thereby causing fraudsters to seek easier opportunities elsewhere. The telecom field is one such area, which has historically had much weaker security awareness and defenses.

The deregulation of the telecom industry coupled with the rise of voice-over-Internet-Protocol (VoIP) has caused the traditional telephony network to be exposed to technologies that it was not originally designed for. This includes the ability to spoof caller identifications (IDs), launch large-scale attacks through automated telephony applications, and to fake personal identities through various means.

The traditional authentication method used by call center agents is one of knowledge-based-authentication (KBA), which relies on call center agents asking the caller to answer questions to which they alone would know the answers. However, the easy availability of personal information through Internet search engines, data breaches in government and corporate networks, and various social media websites, has given fraudsters the ability to gather a wide variety of data, thereby providing them with the ability to convince call center agents that they indeed are who they are pretending to be. Call center agents being in the role of assisting their customers are particularly vulnerable to the social engineering practices used by fraudsters. All of these factors have contributed to a steady and steep increase in call center fraud.

Many existing fraud detection systems use a fraudster database (also referred to as a fraud database) containing fraudster profiles. Whenever a new call is processed, a fraudster database is referenced (or looked up) to verify if a match can be found in the database for the current caller. The lookup may be based on a variety of approaches, such as, for example, a voice print or a phone print, or another biometric, but the overall approach has remained relatively constant in involving the lookup against a fraudster database. The approach may be based on three essential requirements being met, including: (1) a fraud must have taken place earlier for a fraudster profile to be created; (2) the incident that occurred should have been identified as fraud by a fraud specialist (or team); and (3) the incident should then be reported along with all relevant data to the fraud detection system, so that a fraudster profile can be created or updated in the fraudster database.

Disadvantages of the foregoing approach are immediately obvious. For instance: the system can only detect fraud when a new incident of fraud is perpetrated by a fraudster who is already present in the fraudster database; the system can only detect fraud when fraudster's actions were successfully identified in the past as fraud; and/or the system can only detect fraud when a fraud incident was successfully submitted to the fraud detection system using a feedback loop or a fraud notification system. When any of the aforenoted requirements are not met, regardless of the sophistication of the technology employed to establish an identity of the caller so that a lookup can be done, the system is unable to meet the expected behavior.

Existing fraud detection systems completely disregard the life cycle aspects of a typical telephone call flow, in that different stages of the call flow may be associated with different types of fraud. For example, a system that uses a voice print would not be able to start the fraud detection process until such time as when the caller starts to speak. As such, no detection is possible during the time the call was received and answered by an interactive voice response (IVR), and during the caller's dual tone multi-frequency (DTMF) interaction with the IVR.

Existing fraud detection systems also are not flexible in addressing the collective requirements of a large group of different clients whose IVR applications and agent interaction call flows are very different. A voice print or phone print-based fraud detection system therefore is of little use to a client whose IVR application is being targeted by fraudsters using DTMF inputs.

A further shortcoming of existing fraud detection systems is the fact that different clients belonging to different industries have vastly different requirements for the desired accuracy of fraud detection. For instance, a financial services company such as a credit card company or a life insurance company has a much more stringent requirement for fraud detection accuracy than that of, for example, a restaurant table reservation service. As such, an unfulfilled need exists for a fraud detection system that is configurable differently in terms of technologies, costs, and accuracies, in a manner that is cost-wise optimal to the different clients.

A further shortcoming of existing fraud detection systems is in how they assume fraud manifests itself. For instance, a person may commit fraud without ever having been associated with fraud earlier and may be calling from a location that has remained the same for several previous calls. A voice print or other biometric solution may be of little or no use in such a case, as would a solution that relies on a phone print or other means to verify the geolocation of the caller. However, a speech analysis solution, as provided by the instant disclosure and described in greater detail below, can analyze the caller-agent discourse to detect incongruent speech patterns that may be useful in detecting that the fraudster may be employing social engineering tactics that are causing stress in the agent's voice. This example is described here merely to illustrate that fraud manifests itself in many different ways, which may be detected by the FDMS system (and method) of the instant disclosure, which may include one or more solutions, depending on the situation. The novel system (and method) disclosed herein may provide a multitude of technologies required to address the many manifestations of fraud, and the novel fraud detection system may adaptively trigger and effectuate the appropriate technologies based on the individual call flows and the fraud risk exposures of different applications, such as, for example, in different industries.

The disclosure provides a novel system and method that overcome the disadvantages discussed above, and that meet an unfulfilled need for accurately, effectively and efficiently detecting a fraudulent call, including a fraudulent call made to a call center.

SUMMARY OF THE DISCLOSURE

According to an aspect of the disclosure, a method and a system for fraud detection and management (FDMS) is disclosed. The system is configured to evolve and grow to meet new threats by introducing new modules into the system. This FDMS method and system comprise a modular, multi-stage, hierarchical, and adaptive fraud detection system which is able to adapt its fraud detection behavior based on a client's fraud risk profile. In an embodiment of the disclosure, the various fraud detection modules in the system may be dynamically loaded and managed by a kernel, which may load the modules into its process space and manage their life cycles and facilitate communication. Recognizing that the type of fraud that can occur at different stages of a call, such as, for example, before a call starts, after the call connects, during IVR, and after connecting to a call center agent, can be very different, the FDMS system may organize the fraud detection modules in a hierarchy, so that each module employs one or more appropriate technologies suitable to the types of fraud that can occur at specific stages of a call's lifecycle.

The system and method effectively, efficiently and accurately detect a fraudulent call. The system comprises a kernel that manages a plurality of fraud detection modules, each of which may utilize a different technology and methodology to detect fraud, independent of other technologies or methodologies—but effectively collaborating via mediation of the kernel. The system may be configured as a modular system, wherein new solution modules can be plugged into the system on the fly to incorporate new fraud detection behaviors and thereby allow the system to grow and evolve.

According to an aspect of the disclosure, a fraud detection and management system (FDMS) platform that detects fraud in a call signal received from a caller device during one or more distinct phases of a call lifecycle is provided. The FDMS platform comprises: a controller that initiates and manages operations of a plurality of components in the FDMS platform; a fraud detection module suite that includes a plurality of fault detection modules, each of which employs a respective fraud detection technology based on the fraud; and a module manager that dynamically selects one or more of the plurality of fault detection modules in the fraud detection module suite to detect the fraud during the one or more distinct phases of the call lifecycle.

The fraud detection module suite may comprise at least one of: a call detail record (CDR) analytics module that searches anomalous behaviors within a caller history; a voice print module that verifies a voice print of a caller voice signal against one or more voice prints stored in a database; a prosody module that analyzes prosodic features of an interaction between a caller on the caller device and a human agent on a caller agent device; and a predictive analytics module that predicts a fraud risk of the call signal.

The module manager may identify and select one or more of: the call detail record (CDR) analytics module to search anomalous behaviors within the caller history associated with metadata in the call signal; the voice print module to verify a voice print of the caller voice signal against a plurality of voice prints stored in the database; the prosody module to analyze prosodic features of the interaction between the caller on the caller device and the human agent on the caller agent device; and/or the predictive analytics module to predict the fraud risk of the call signal.

The FDMS platform may determine an initial risk estimate of fraud when the call signal is received. The initial risk estimate of fraud may be based on at least one of a call number, a caller history associated with the call number, and a consistency of call metadata correlations of the caller history.

The FDMS platform may determine whether a recording of the call signal should be made based on a voice print of a caller when the caller interacts with an interactive voice response (IVR).

The plurality of components may comprise: a telnet management interface that facilitates loading, unloading, or upgrading one or more of the fraud detection modules; a notification manager that receives a fraud notification signal from the fraud detection module suite and dispatches a fraud alert signal to a client server; a pub/sub manager that receives the call progression data and sends the data to the fraud detection module suite; a REST API server that includes a RESTful API that can be invoked by a client server to report detected fraud to the platform; or a Case/ML manager that includes a plurality of case records that are referenced by the platform to assess effectiveness of a current fraud model.

The controller may comprise: a boot strapper that instantiates each of the plurality of components; a system monitor that monitors each of the plurality of components, and that receives a periodic status report signal from each of the plurality of components; or a configuration manager that loads and maintains an overall system configuration of the platform.

According to a further aspect of the disclosure, a fraud detection and management system (FDMS) platform that detects fraud in a call signal received from a caller device during one or more distinct phases of a call lifecycle is provided. The FDMS platform comprises: a fraud detection module suite that includes a plurality of fault detection modules, each of which employs a respective fraud detection technology based on the fraud; and a module manager that dynamically selects one or more of the plurality of fault detection modules in the fraud detection module suite to detect the fraud during the one or more distinct phases of the call lifecycle based on a client risk profile.

According to a still further aspect of the disclosure, a method for fraud detection and management is provided, which comprises: receiving a call signal from a caller device; selectively identifying one or more fraud detection modules in a fraud detection module suite based on the call signal; dynamically loading the selectively identified one or more fraud detection modules in a fraud detection and management system platform; and processing the call signal by the selectively identified one or more fraud detection modules to determine a fraud risk score for the call signal.

The method may further comprise: retrieving a client risk profile from a database; and processing the call signal by the selectively identified one or more fraud detection modules based on the client risk profile to determine the fraud risk score for the call signal.

The selectively identifying the one or more fraud detection modules may be based on a stage of a lifecycle of the call signal, including before a call starts, after the call connects, during interactive voice response (IVR), or after connecting the call to a call center agent device.

According to a still further aspect of the disclosure, a system is provided for fraud detection and management that includes a first communication device that receives a phone call from a second communication device, wherein a call flow of the phone call includes one or more distinct phases of a call lifecycle. The system includes a fraud detection and management system (FDMS) platform that determines whether the phone call exceeds a predetermined risk threshold at each distinct phase of a call flow.

The first and second communication devices may include at least one of a land-line telephone, a mobile phone, a smart phone, a cellular phone, a satellite phone, a voice-over-Internet Protocol (VoIP) phone, and a computer having voice reception and production capabilities.

The FDMS platform may determine an initial risk estimate of the phone call when the phone call is received but not answered by an IVR based on at least one of a telephone number (e.g., ten-digit number) of the caller device, caller history associated with the telephone number, and the consistency of call metadata correlations determined from caller history.

The FDMS platform may perform at least one of verifying the telephone number against a watch list, analyzing the caller history associated with the telephone number for any anomalous behaviors, and verifying the consistency of call metadata correlations determined from caller history.

The FDMS platform may determine whether a recording of the phone call should be made based on a voice print of the caller when the phone call is answered by the IVR and a caller of the phone call interacts with the IVR.

The FDMS platform may determine whether the recording of the phone call should be retained for post-call analytics based on the voice print of the caller and Prosodic data of the voice print when the phone call is transferred to a human agent and the caller interacts with the human agent.

The FDMS platform may analyze a text transcribed from the recording of the phone call for further analysis when the phone call is terminated.

According to yet another aspect of the disclosure, a method for fraud detection and management includes determining an initial risk estimate of a phone call when the phone call is received but not answered by an interactive voice response (IVR) based on call information. The method may include determining whether a recording of the phone call should be made based on the call information and a voice print of the caller when the phone call is answered by the IVR and a caller of the phone call interacts with the IVR.

The call information may include at least one of a telephone number of the caller device, a caller history associated with the telephone number, and the consistency of call metadata correlations determined from caller history.

The determining the initial risk estimate may include at least one of verifying the telephone number of the caller device against a watch list, analyzing the caller history for any anomalous behaviors, and verifying the consistency of call metadata correlations from the caller history.

The method may further include determining whether a recording of the phone call should be made based on a voice print of the caller when the phone call is answered by the IVR and a caller of the phone call interacts with the IVR.

The method may further include determining whether the recording of the phone call should be retained for post-call analytics based on the voice print of the caller and Prosodic data of the voice print when the phone call is transferred to a human agent and the caller interacts with the human agent.

The method may further include analyzing a text transcribed from the recording of the phone call for further analysis when the phone call is terminated.

According yet another aspect of the disclosure, a fraud detection and management system (FDMS) platform includes a fraud detection suite including a plurality of fraud detection modules that determine whether a phone call from a first communication device exceeds a predetermined risk threshold. The FDMS platform includes a system component unit that dynamically loads one or more fraud detection modules depending on a call flow of the phone call comprising one or more distinct phases of a call lifecycle.

The plurality of fraud detection modules may include a call detail record (CDR) analytics module that searches anomalous behaviors within a caller history of the first communication device, a voice print module that verifies a voice print from the phone call against a watch list, a Prosody module that analyzes Prosodic features of an interaction between a caller of the phone call and a human agent, and a predictive analytics module that applies a fraud detection module to the phone call to predict a fraud risk of the phone call.

The FDMS platform may include a history database that stores caller data for the caller and a call detail record (CDR) database that stores call leg data that has resulted during operations of the FDMS platform.

The FDMS components may include a controller that manages a life cycle of the FDMS platform, and a module manager that is in communication with the plurality of fraud detection modules and dynamically loads or selects one or more of the fraud detection modules depending on a call flow of the phone call.

The system component unit may include at least one of a notification manager that receives a fraud alert notification from the fraud detection suite and outputs a notification massage to a client, a Telnet management interface that establishes a communication channel between the client and the controller, a data ingress manager that provides the fraud detection suite with call data, a report application server that provides a report API to the client for reporting a detected fraud event to the FDMS platform, and a case manager that updates a case database when a report is received from the client via the report application server.

The module manager may activate the CDR analytics module when the phone call is received but not answered by an interactive voice response (IVR) to determine an initial risk estimate based on at least one of a telephone number of the caller device, caller history associated with the telephone number, and the consistency of call metadata correlations determined from the caller history.

The module manger may activate the voice print module to determine whether a recording of the phone call should be made when the phone call is answered by an interactive voice response (IVR) and a caller of the phone call interacts with the IVR.

The module manger may activate the voice print module and the Prosody module to determine whether the recording of the phone call should be retained for post-call analytics when the phone call is transferred to a human agent.

Additional features, advantages, and embodiments of the disclosure may be set forth or apparent from consideration of the detailed description, drawings and attachment. Moreover, it is to be understood that the foregoing summary of the disclosure and the following detailed description, drawings and attachment are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

Figure 1:
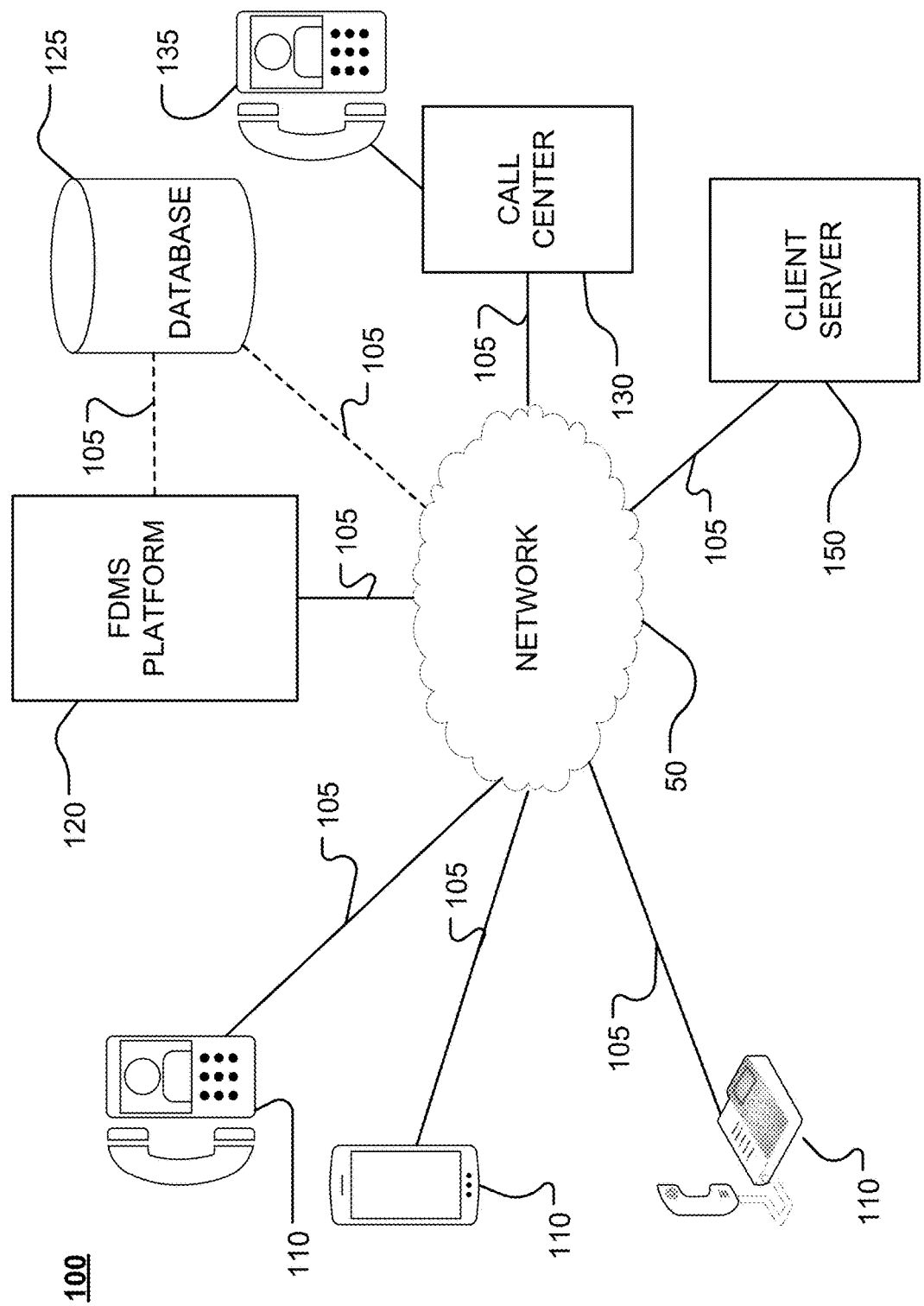
FIG. 1 shows an example of a communication system, constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows an example of a communication system 100, constructed according to the principles of the disclosure. The communication system 100 includes, for example, one or more communication (or caller) devices 110, a fraud detection and management system (FDMS) platform 120, a call center 130 and a network 50, all of which are communicatively connected via a communication link 105. The call center 130 may include one or more caller agent devices 135. The system 100 may further include a database 125, which may be located locally to the FDMS platform 120, or remotely. The database 125 may be coupled directly to the FDMS platform 120 via a communication link 105, or through the network 50 and a communication link 105. The FDMS platform 120 may include one or more computers and/or one or more servers. The system may further include a client server 150, which may be communicatively coupled in the system 100 via a communication link 105.

The communication (or caller) device 110 and the caller agent device 135 may include, for example, a land-line telephone, a mobile phone, a smart phone, a cellular telephone, a satellite phone, a voice-over-Internet-Protocol (VoIP) phone, a computer having video and/or audio reception and production capabilities, or the like. A call may be initiated from the communication device 110 and a call signal transmitted via the communication link 105 and network 50. The call signal may include metadata such as, for example, SIP-T data, including, for example, originating line information (OLI) data, calling party number (CPN) data, forward call indicator (FCI) data, circuit identification code (CIC) data, automatic number identification (ANI) data, dialed number identification service (DNIS) data, jurisdiction information parameter (JIP) data, diversion data, signaling information field (SIF) data, and the like. The call signal may include one or more voice signals, including, for example, a voice signal generated by the caller device 110 based on a caller (not shown) speaking into the caller device 110, an interactive voice response (IVR) voice signal, a voice signal generated by the caller agent device 135 based on an agent (not shown) speaking into the caller agent device 135, or the like.

The client server 150 may be located at, for example, a (virtual or physical) site belonging to a client, a service provider, a retailer, a product supplier, a manufacturer, or any other individual or entity that may benefit from the instant disclosure.

Referring to FIG. 1, when an inbound call is received by the FDMS platform 120 from a caller device 110, a dialed number identification service (DNIS) or the like may be used to look up and identify an interactive voice response (IVR) that should answer the call and/or interact with the caller along with the client who owns or subscribes to fraud detection and management services rendered by the FDMS platform 120. The client identity may then be used by the FDMS platform 120 to look up a fraud risk profile (FRP) associated with the client to determine a fraud risk treatment to be given to the call. This determination may be made individually for each incoming call. Based on the determination, the FDMS platform 120 may adaptively and dynamically select and load one or more fraud detection modules 23 (shown in FIG. 2) to launch an appropriate configuration bundle that will process the call for fraud detection and management. For example, the FDMS platform 120 may indicate to each fraud detection module 23 as to whether it is enabled or disabled, and, if enabled, what processing parameters and risk notification thresholds should apply for that call. The FDMS platform 120 may thus adapt itself distinctly and individually in processing each call coming into each of the clients' call centers 130 or directed to a phone number that each client has set up for customer service.

Another aspect of the FDMS platform 120 that relates to its adaptive nature is how the risk assessment of different modules 23 (shown in FIG. 2) at various stages of the call flow cause the FDMS platform 120 to trigger actions that may need to occur downstream. For instance, an early risk assessment may cause the FDMS platform 120 to indicate that recordings should be made of the call; and, further risk assessments at later stages of the call by other modules 23 may cause the FDMS platform 120 to indicate that the recordings should be retained until the fraud cases have been finalized with a proper determination.

In a typical inbound call that may be serviced by the call center 130, and, more particularly, the caller agent device 135, the call flow may involve one or more distinct phases or stages. Each such phase or stage can be associated with a certain amount of data that is available to the fraud detection modules 23. At any given stage, certain types of techniques may be used given the nature of the data available at that stage of the call flow. The below Table 1 shows a non-limiting example of how the fraud detection modules 23 may correspond to the various phases of a call flow in a given call lifecycle. It is understood that the below descriptions provide a relatively simple example of an inbound call, and that many other call flows are possible. The description can be reasonably applied to any variation of a call flow that may be expected to contain similar phases as are described here.

TABLE 1

| Phase | Description |
|---|---|
| Call is received | The call is not yet answered by an IVR. The data available at this time may include the caller number, called number, Originating Line Information (OLI), other Integrated Services Digital Network User Part (ISUP) data that may include the Jurisdiction Information Parameter (JIP), carrier code, and other Session Initiation Protocol for Telephones (SIP-T) information. Verify the caller number against any watch lists. Retrieve caller history and analyze the history for anomalous behaviors. Verify the consistency of the call metadata correlations across the available history. The FDMS platform 120 may use a Call Detail Record (CDR) Analytics Module 24 (shown in FIG. 2) during this phase. This may allow the FDMS platform 120 to arrive at an initial risk estimate for the call. This initial risk assessment may result in the FDMS platform 120 signaling to a recording system that a recording of the call should be made (if allowed) so that additional analysis tasks requiring a recording can be accomplished after the call terminates. |
| Call is answered and caller interacts with an IVR | All the data for the previous phase is also available here. Depending on whether the IVR prompts the user for voice responses, a voice print may or may not be available. Depending on whether the caller speaks, the FDMS platform 120 may use the Voice Print Module 25 (shown in FIG. 2) during this phase. The risk assessment may result in the FDMS platform 120 signaling to the recording system that a recording of the call should be made (if allowed and if the caller is transferred to an agent) so that additional analysis tasks requiring a recording can be accomplished after the call terminates. |
| Call is transferred to a call center agent device | All the data for the previous phase is also available here. Since the caller is being transferred to an agent device, a voice print is going to be available. Prosodic data may also be available. The FDMS platform 120 may use the Voice Print Module 25 and Prosody Module 26 (shown in FIG. 2) during this phase if the client risk profile requires it. Depending on the risk assessment during this phase, the FDMS platform 120 may signal to the recording system that the call recording should be retained and not purged for an extended period of time so that post-call analytics may be performed on the call recording. |
| Call terminates | A recording of the conversation may be available for any further analysis. Given the overall risk assessment of the just ended call, the FDMS platform 120 may use the speech analytics module to analyze, for example, transcribed text obtained from the recording (using the platform facilities such as Call Miner). |

Referring to FIG. 1, the communication system 100 may generate vast amounts of data from a multitude of sources, such as, for example, the communication device(s) 110, the call center 130, and/or the client server 150. This data may be received as streaming data and stored in the database 125 as raw data. The raw data may be retrieved by one or more data interfaces in the FDMS platform 120, cleaned, transformed, manipulated, processed, compressed and/or reduced through analytics, as described in greater detail below. The data stored in the database 125 may include application logs, Call Detail Records (CDRs), CDR events, call recordings, call miner data, call quality metrics (e.g., Voice Clarity Measurement Enhancement (VCME)), Contextual User Experience (CUE) events, voiceID data (e.g., Prosody module 26 outputs), or the like. The database 125 may include partitions, so that partitions can be moved out of the database 125 when they are no longer relevant, thereby allowing for efficient management of the database 125.

The data in the database 125 may be retrieved, processed and output to a GUI (not shown) to be viewed and/or reproduced to one more external applications (not shown).

Figure 2:
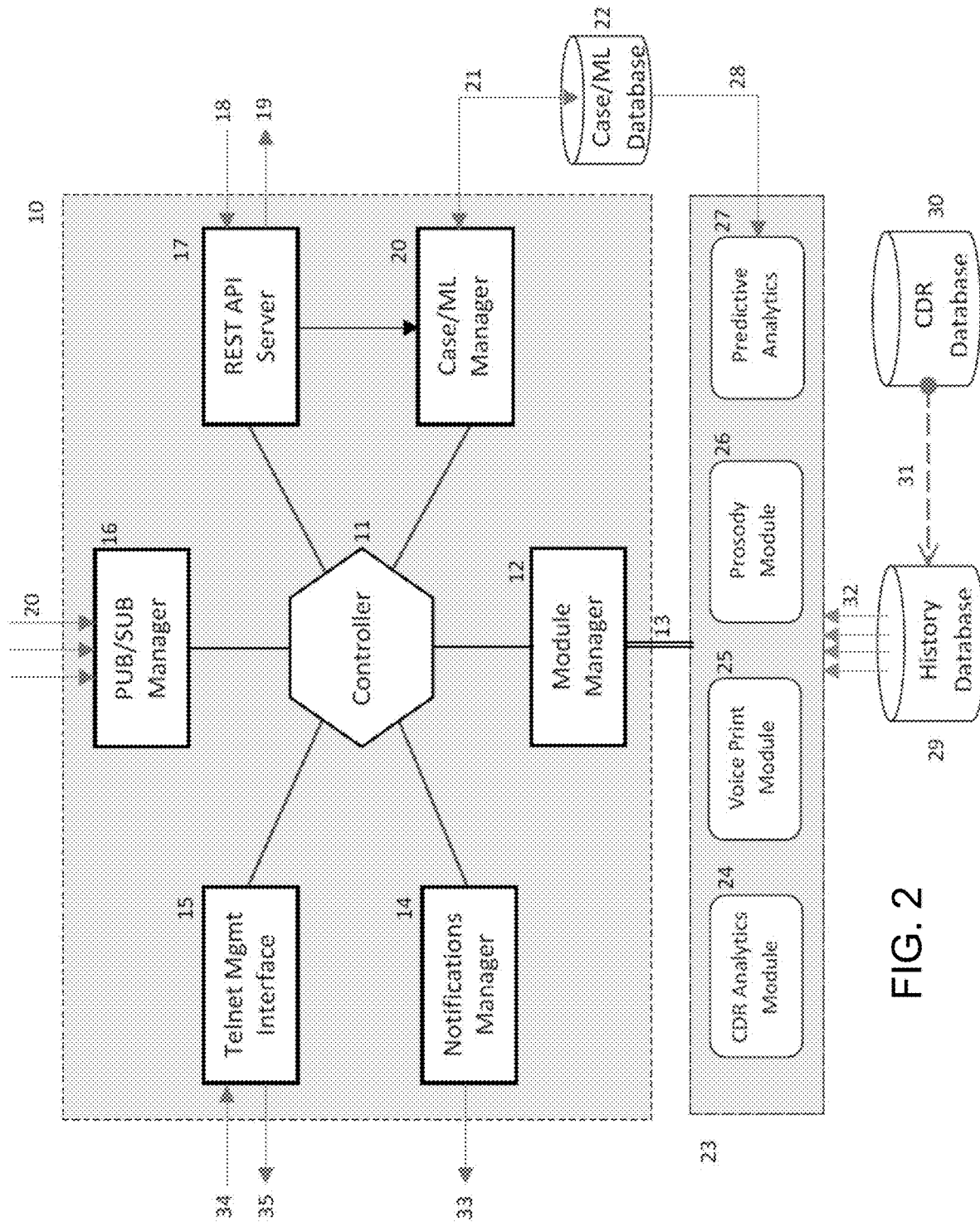
FIG. 2 shows an example of a fraud detection and management system platform that may be included in the communication system of FIG. 1, according to the principles of the disclosure.

FIG. 2 shows an example of the FDMS platform 120, constructed according to the principles of the disclosure. The FDMS platform 120 may be assembled from a plurality of discrete software and/or hardware components, which may include one or more server applications executed on a server and designed to detect fraud in the telephone calls being serviced in the communication system 100 (shown in FIG. 1), such as, for example, a telephony platform. The FDMS platform 120 may comprise a plurality of integral system components and a multitude of dynamically loadable external components (modules), which may be dedicated to the purpose of fraud detection.

Referring to FIG. 2, the FDMS platform 120 includes FDMS components 10 and a fraud detection suite 23. The FDMS platform 120 may include case-based reasoning (CBR), artificial neural networks, or the like. The FDMS platform 120 may implement one or more machine learning algorithms, including, for example, decision tree learning, association rule learning, artificial neural network learning, deep learning, clustering, Bayesian network learning, reinforcement learning, representation learning, and/or the like.

The FDMS platform 120 may include a Case/ML (Machine Learning) database 22, a history database 29, and a CDR database 30, which may be located in the FDMS platform 120 (shown in FIG. 1) and/or the database 125 (shown in FIG. 1). The Case/ML database 22 may include, for example, one or more cases and/or training examples, each of which may include a problem and a solution to the problem. The one or more cases and/or training examples may include annotations regarding how a solution to a given problem was determined or achieved. The database 125 may include records of known ANIs that have not been spoofed and those that have been used to attempt or commit fraud.

The FDMS components 10 may include a Controller 11, a Module Manager 12, a Notification Manager 14, a Telnet Management Interface 15, a Publication/Subscriber (Pub/Sub) Manager 16, a server (e.g., REST API server) 17, and a Case/Machine Learning (ML) Manager 20.

The fraud detection suite 23 may include one or more fraud detection modules, including, for example, a CDR Analytics Module 24, a Voice Print Module 25, a Prosody Module 26, and/or a Predictive Analytics Module 27.

The Case/ML database 22, the history database 29, and/or the CDR database 30 may be communicatively linked to the FDMS system components 10 and/or the fraud detection suite 23.

The Controller 11 may include a bootstrap component that initializes the various integral FDMS components 10 and manages the life cycle of the FDMS platform 120 server processes. The Controller 11 includes a kernel that is configured to control the FDMS components 10. The kernel may be loaded (for example, by the FDMS platform server) at start-up of the FDMS platform 120 (shown in FIG. 1). The kernel may initiate/terminate and control operation of the FDMS components 10. The kernel may execute multiple threads simultaneously. The kernel may be communicatively coupled to each of the FDMS components 10, including, the Module Manager 12, the Notification Manager 14, the Telnet Management Interface 15, the Pub/Sub Manager 16, the server 17, and the Case/ML Manager 20. The kernel may be further communicatively coupled to the fraud detection suite (or fraud detection modules) 23 via the Module Manager 12.

The Module Manager 12 is the FDMS component responsible for communicating with the fraud detection suite 23, and selecting and loading one or more of a plurality of fraud detection modules 23 into the FDMS platform 120 via a communications link 13. According to one embodiment of the disclosure, the various fraud detection modules 23 are implemented as dynamically loaded shared modules, but alternative embodiments are possible wherein the fraud detection modules 23 are external processes that communicate with the Module Manager 12 using, for example, inter process communication (IPC) mechanisms. In the latter regard, control and data signals may be communicated between the Module Manager 12 and one or more fraud detection modules 23 via a communication link.

Communication between the Module Manager 12 and the fraud detection modules 23 may be made possible by several functional interfaces that all of the fraud detection modules 23 may be required to implement. These interfaces (not shown) may be the means by which the Module Manager 12 may be able to load, initialize, run, communicate, stop, and unload the fraud detection modules 23 in the FDMS platform 120. The fraud detection modules 23 may communicate only with the Module Manager 12 for outbound communication. The Module Manager 12 may then route the various messages to the other components within the FDMS components 10. In a similar fashion, all inbound messages and data may be received by the Module Manager 12, which may then route the data to the fraud detection modules 23. The Module Manager 12 may operate under control of the kernel provided in the Controller 11.

The fraud detection suite 23 may be communicatively coupled to the Case/ML database 22 and/or the history database 29, as seen in FIG. 2.

The Notifications Manager 14 is the FDMS component responsible for receiving fraud alert messages or notification messages from the fraud detection modules 23 and dispatching notification message signals on a communications link 33 to clients (e.g., call center 130 and/or client server 150, shown in FIG. 1) that may be listening for fraud alert signals from the FDMS platform 120. Clients (e.g., call center 130 and/or client server 150) of the FDMS platform 120 may provide, for example, web service hooks that allow the Notifications Manager 14 to call back on the communications link 33 with all relevant information about suspected fraud.

The Telnet Management Interface 15 provides system management facilities that may be implemented by, for example, operations personnel. The Telnet Management Interface 15 may receive an input Telnet signal 34 comprising a control signal and/or a data signal, as discussed below. The Telnet Management Interface 15, which is communicatively coupled to the Controller 11, may provide an output Telnet signal 35 that includes control and/or data signals, including the essential administrative command signals to manage the operation of the FDMS platform 120. The control/data signals provided in the output Telnet signal 35, and output by the Telnet Management Interface 15, may provide system administrators with the necessary tools to load, unload, or upgrade the various fraud detection modules 23. The command and/or data signals in the output Telnet signal 35 may provide the tools necessary to update the configuration of the various FDMS components 10 or the fraud detection modules 23 in the FDMS platform 120, for example, at runtime.

The Pub/Sub Manager 16 is communicatively coupled to the Controller 11. The Pub/Sub Manager 16 has one or more inputs that receive corresponding one or more call signals 20, which may be received form the one or more caller devices 110 (shown in FIG. 1). The Pub/Sub Manager 16 may function as a data ingress component of the FDMS platform 120 that feeds the fraud detection modules 23 with call data. The Pub/Sub Manager 16 is responsible for establishing the channels for all incoming data into the FDMS platform 120. This data may include call life cycle events (CDR events), short term spectral analysis events providing voice prints of callers, higher order audio analysis events such as prosody events relating to the caller and the agent, or the like. The received call data signals 20 may be sent by, or under the control of the Pub/Sub Manager 16 to the various fraud detection modules 23 via the Module Manager 12.

The REST API server 17 may be located within the FDMS components 10, or remotely. The REST API server 17 is communicatively coupled to the Controller 11. The REST API server 17 may be further communicatively coupled to the Case/ML Manager 20. The REST API server 17 provides RESTful APIs that can be invoked by the clients (e.g., call center 130 and/or client server 150, shown in FIG. 1) to report detected fraud to the FDMS components 10. The RESTful API(s) may be provided in a server output signal 19. This may be considered to be the converse of the Notifications Manager 14, which sends reports of suspected fraud to the clients. These APIs may allow clients to open new fraud cases, update the status of existing fraud cases, and close fraud cases with a final determination.

The invocation of a web service within the REST API server 17 may be done through a Hypertext Transfer Protocol (HTTP) request with, for example, a JavaScript Object Notation (JSON) payload conformant with the FDMS system components 10 request schemas. The REST API server 17 may receive requests by way of a server input signal 18. Each HTTP request may result in an appropriate HTTP response containing a valid HTTP response code and an optional JavaScript Object Notation (JSON) payload appropriate to the request and conforming to the FDMS platform 120 response schemas.

HTTP requests arriving at the REST API server 17 as the server input signal 18 may be first authenticated and then the contents of the messages in the input signal 18 may be validated to conform to the published schemas. The requests may be forwarded by the REST API server 17 to the Case/ML Manager 20. The Case/ML Manager 20 may be responsible for processing the incoming API requests to manage the fraud cases' life cycle in the Case/ML database 22. The Case/ML Manager 20 may be responsible for maintaining one or more fraud detection models in the Case/ML database 22, and the Case/ML Manager 20 may be responsible for learning from reported incidents of fraud.

Requests that deal with opening new cases, updating or closing of existing cases, or the like, may cause the Case/ML Manager 20 to update the corresponding case records in the Case/ML database 22. Any case that is closed with a final determination of fraud may yield information about the effectiveness of the current fraud model. The Case/ML Manager 20 may also update the associated caller history.

The Case/ML database 22 may contain fraud management data records that typically deal with representation of fraud cases within the FDMS system components 10. The Case/ML database 22 may contain one or more fraud prediction models. A fraud prediction model may consist of a machine learning algorithm (e.g. Logistic regression, k-means clustering, Support Vector machines, Random Forest, etc.), any relevant configuration for the algorithm (e.g. the initial value of k in k-means clustering), the ratio of fraudulent to non-fraudulent records in the training set, and the set of features chosen to represent a record in the training set.

The Case/ML database 22 may include a confusion matrix that tracks the effectiveness of the fraud prediction models. A confusion matrix describes the performance of a classification model. A confusion matrix tabulates the true positives (TP), true negatives (TN), false positives (FP), and the false negatives (FN). It may look like the Table 2 shown below.

TABLE 2

|  | Predicted As Fraud | Predicted As Non-Fraud | Total |
|---|---|---|---|
| Actual Fraud | 6 (TP) | 4 (FP) = | 10 |
| Actual Non-Fraud | 3 (FN) | 128 (TN) = | 131 |
| Total = | 9 | 132 | 141 |

The accuracy of a model is given by (TP+TN)/total, which in the above example yields an accuracy of 95 percent.

Each of the fraud detection modules 23 may be required to have certain uniform characteristics implemented in the programming interfaces that are required by the FDMS platform 120. This allows the FDMS platform 120, including the Controller 11, to treat all of the fraud detection modules 23 in a uniform manner. This uniformity also allows the capabilities of the FDMS platform 120 to be upgraded at any time by unloading and reloading an upgraded module and to add new types of fraud detection modules to the fraud detection suite 23 (shown in FIG. 2), so that the overall system can evolve and grow to meet new threat vectors.

The CDR Analytics Module 24 is communicatively coupled to the Module Manager 12 and the history database 29. The history database 29 may be communicatively coupled to, or include the CDR database 30. The CDR Analytics Module 24 is a fraud detection module that relies on caller history to detect anomalous behaviors within the caller's history, as well as incongruent behavior when compared to the overall behavior of all callers using the telephony platform. The CDR Analytics Module 24 may rely on historical data and expected data correlations that are expected to exist over a period of time spanning a plurality of calls from the same caller. The historical data may be mined in a number of ways, including, for example: determining the number of times a particular caller has called, which may be grouped by the destination number; periodicity of the caller (e.g., every month to pay bills, etc.); patterns within the periodicity (e.g., pay bill, call back later to verify); application interaction patterns (e.g., indicative of intent or purpose); prosodica scores in past calls (e.g., conversational patterns); or the like. The mined historical data may be processed to determine, for example, whether: a caller is a repeat caller based on the frequency of calls in a certain time period; whether a call is likely to be a phishing attempt (e.g., an ANI has been used to call a large number of different destination numbers); whether a call is likely to be employing social engineering (e.g., an ANI has called in a great number of times and has transferred to a call center each time); whether a call is consistent with predetermined patterns (e.g., when a certain caller has a pattern of calling in and then, a little later, calling in and following a sequence of steps, resulting in approximately the same duration); or the like.

The CDR Analytics Module 24 may be configured to process recordings of calls and extract textual content data, which may be transcribed into a contextual thumbprint of each call. This process may be carried for every call, or for a subset of calls. The thumbprints, together with knowledge of reported fraudulent calls, may be used to train a machine learning algorithm to identify fraudulent calls after they have concluded and the call recording was processed.

The Voice Print Module 25 is communicatively coupled to the Module Manager 12 and the history database 29. The Voice Print Module 25 is a fraud detection module that relies on a dynamically computed voice print (or signature) of the caller for the current call and finds a match of that voice print against the voice prints stored in history records within the history database 29. A voice print within the FDMS system components 10 need not be dispositive in identifying a caller, but, instead, may be considered as another data element associated with a call that may be used in identifying the caller. The voice print may be generated by the Voice Print Module 25 by transforming the voice signal in the call signal using one or more digital signal processors (DSPs) that may implement, for example, a Discrete Fourier Transform (DFT), a Short-Time Fourier Transform (STFT), a Discrete-Time Hilbert Transform, or the like.

The Prosody Module 26 is communicatively coupled to the Module Manger 12. The Prosody Module 26 may be communicatively coupled to the history database 29. The Prosody Module 26 is a fraud detection module that relies on the prosodic features (or parameters) of the caller-agent discourse. The prosodic features may be determined as described in U.S. Pat. No. 8,897,437, issued Nov. 25, 2014 to Mariano Tan, et al., which is incorporated herein by reference in its entirety.

The Prosody Module 26 may analyze an interaction of the caller with the call center agent in real time and generate various prosodic features that may be indicative of the level of engagement and quality of service of a given call. Typically, when a call has indications of fraud or something unusual, the agent may become aware of certain incongruity and it becomes possible for the Prosody Module 26 to trigger an event to indicate that the agent is uncomfortable with the engagement. The Prosody Module 26 may process the voice signal(s) in the call signal and determine the following prosodic features of each voice signal, including: pitch, intonation, articulation, tempo, accent, talk over, interruption frequency, speaker dominance, turn-taking, conversational balance, voice stress, and the like. The Prosody Module 26 may rely on the presence of stress within an agent's voice without a corresponding stress within the caller's voice, indicative of the agent suspecting of being socially engineered by a fraudster—who typically are well prepared in social engineering practices and hence may not exhibit any undue stress on their part. The Prosody Module 26 may generate a prosodic voice ID that includes the determined prosodic features for a given call.

The Predictive Analytics Module 27 is communicatively coupled to the Module Manager 12 and the history database 29. The Predictive Analytics Module 27 is a fraud detection module that uses machine learning algorithms and the data points (feature vectors) constructed for the current call to predict fraud risk in that call. While the Case/ML Manager 20 is responsible for learning from reported fraud, the Predictive Analytics Module 27 is responsible for applying the fraud detection model to predict fraud that may be associated with incoming calls.

The currently configured fraud detection model may be fetched from the Case/ML database 22 at predetermined times, such as, for example, at periodic intervals, by the Predictive Analytics Module 27. For instance, the Predictive Analytics Module 27 may select and retrieve a machine learning algorithm (e.g. Logistic regression, k-means clustering, Support Vector machines, Random Forest, etc.), any relevant configuration for the algorithm (e.g. the initial value of k in k-means clustering), the ratio of fraudulent to non-fraudulent records in the training set, and the set of features chosen to represent a record in the training set.

The history database 29 may contain the entire call history of all callers that have ever called into a telephony platform. The history database 29 may contain all significant details of each interaction from each call made by callers in the past. A call originating from a caller may result in numerous call legs—caused by operational elements of the platform (e.g., back-to-back user agent (B2BUA), call transfers, wait queues, etc.). A single interaction of a caller with the platform may contain any number of individual call legs, but may be considered as one unique interaction. A history record (or history document) within the history database 29 may capture an entire interaction in a single record or document.

The Call Detail Record (CDR) database 30 may be the primary data repository of the FDMS platform 120. The CDR database 30 may include extensive data for every single call leg that has resulted during the FDMS platform 120 operation. A unique caller interaction may contain many call legs and each call leg may be associated with a number of different types of records within the CDR database 30.

The history database 29 may be designed for purposes of fraud detection. The history database 29 may be initially constructed from the CDR database 30. This may be done by a one-time seeding of the history database 29 from the CDR database 30 to capture all caller histories prior to the seeding date. From that point onwards, the FDMS components 10 may maintain the history database 29 on its own by inserting a history record into the history database 29 for every concluded caller interaction.

Historical data retrieved from the history database 29 may be used in combination with the live call data received from the Pub/Sub Manager 16. The aggregated data (which changes continually during the life time of a call) may be processed by the various fraud detection modules 23 throughout the life of a call.

The fraud detection modules 23 may emit a fraud notification message signal whenever the accumulated call data for the current call, in combination with the data in the caller history, exceeds a configured risk threshold for the fraud detection module(s). The fraud notification message signal may be sent from the fraud detection suite 23 to the Notifications Manager 14 via the Module Manager 12. The Notifications Manager 14 may perform two functions. First, it may apply one or more score normalization rules specified in the FDMS platform 120 configuration to combine all of the notifications received from the one or more fraud detection modules 23. These rules may contain score thresholds, as well as the rules for weighting and combining the individual fraud scores. The rules may be client-specific and/or client-defined, and the rules may be stored in the database 125 (shown in FIG. 1) in associated client records, including client risk profiles. Second, the aggregated scores and notifications may be dispatched to the client applications and web services configured in the FDMS platform 120 via, for example, Transmission Control Protocol/Internet Protocol (TCP/IP) connections or HTTP POST requests.

The Telnet Management Interface 15 allows an administrator to telnet into the FDMS platform 120 (manually or programmatically) via the input signal 34 and issue system management commands. These commands may be processed directly by the Telnet Management Interface 15, or may be directed to one or more of the FDMS components 10, or to any of the fraud detection modules 23. When routing commands that are received in the input signal 34 to the fraud detection modules 23, the Module Manager 12 may proxy the commands and the responses to the fraud detection modules 23.

When a telnet command (on input signal 34) is a query or requires confirmation or other output, a response may be sent back to the telnet client (e.g., call center 130 or client server 150, shown in FIG. 1).

Figure 3:
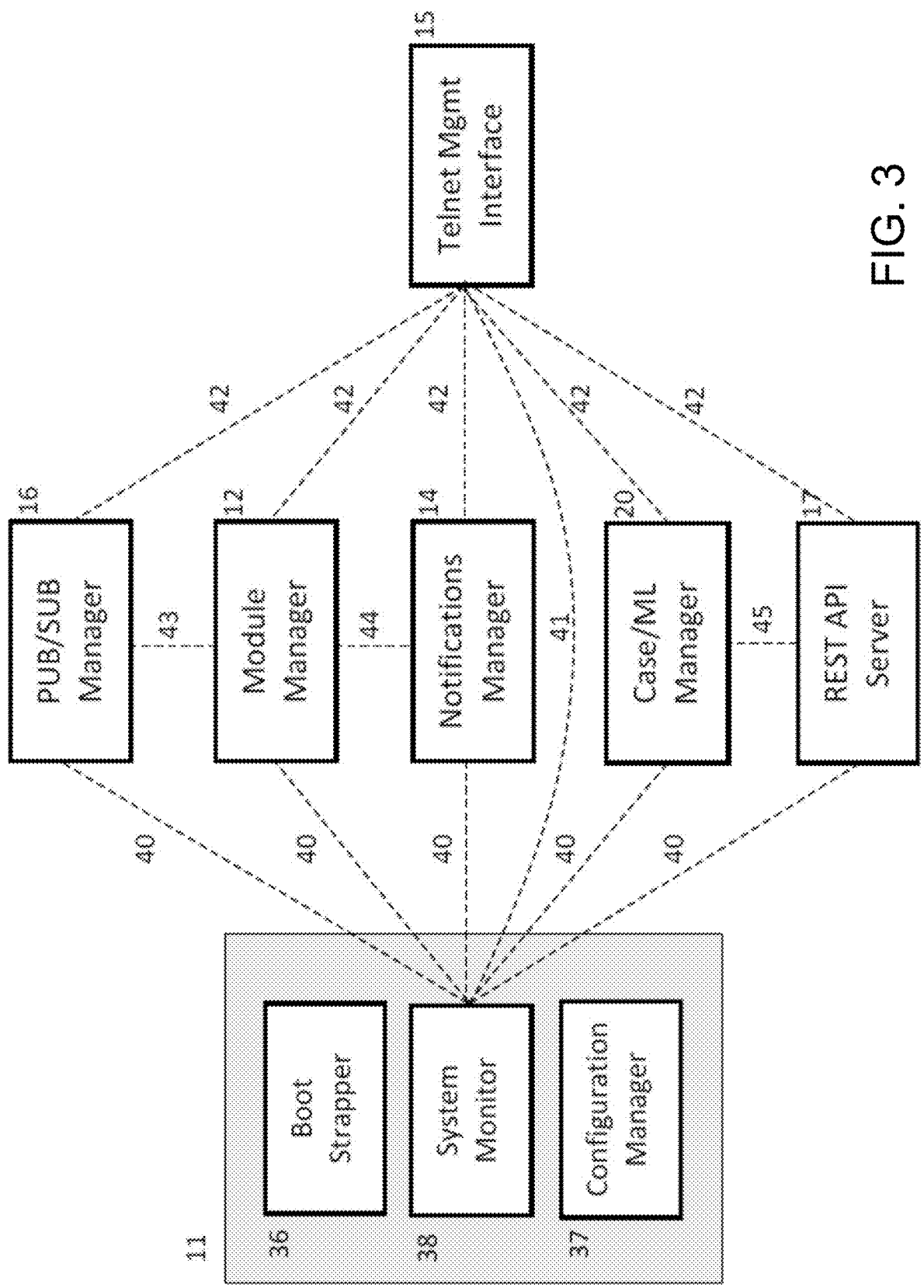
FIG. 3 shows a portion of the fraud detection and management system platform shown in FIG. 2, including an example of a controller constructed according to the principles of the disclosure.

FIG. 3 shows a portion of the FDMS system components 10, including an example of the Controller 11. As seen in FIG. 3, the Controller 11 includes a Boot Strapper 36, a System Monitor 38, and a Configuration Manager 37. The Boot Strapper 36 is responsible for instantiating all of the integral FDMS components 10 and then establishing the necessary relationships between them so that the various FDMS components have their dependencies satisfied.

The first FDMS component 10 that may be created by the Boot Strapper 36 is the Configuration Manager 37, which is responsible for initially loading and then maintaining the overall system configuration of the FDMS components 10. The Configuration Manager 37 may be globally accessible to all FDMS components 10 (and more broadly, the FDMS platform 120) in a thread-safe manner.

The second system component that may be created by the Boot Strapper 36 is the System Monitor 38, which is responsible for continuously monitoring all the FDMS components 10. All of the FDMS components 10 may be expected to submit a status report to the System Monitor 38 periodically, such as, for example, every second, or every millisecond, or any other periodic interval, as the skilled artisan will understand. The individual fraud detection modules 23 (shown in FIG. 2) loaded by the FDMS platform 120 may be expected to submit their status reports at the same periodic interval. The status reports may be routed from the individual fraud detection modules 23 to the System Monitor 38 by the Module Manager 12.

After creating the Configuration Manager 37 and the System Monitor 38, the Boot Strapper 36 may instantiate all of the other FDMS components 10. The order of instantiation may be, for example, as follows: Telnet Management Interface 15→Notifications Manager 14→Case/ML Manager 20→Module Manager 12→Pub/Sub Manager 16→REST API server 45. Other instantiation orders are herein contemplated.

The Boot Strapper 36 may set the System Monitor 38 as the reporting destination to each of the FDMS components 10, except the Telnet Management Interface 15. The relationship between the Telnet Management Interface 15 and the System Monitor 38 may be different. For instance, the Telnet Management Interface 15 may not be expected to submit any reports to the System Monitor 38, but instead the System Monitor 38 may act as a report source to the Telnet Management Interface 15. Whenever a "status" command is issued to the Telnet Management Interface 15, it may fetch the most current status report from the System Monitor 38, which may consist of all of the individual status reports from the various system components and the fraud detection modules 23 in the FDMS platform 120.

The Telnet Management Interface 15 may essentially function as a command center for the FDMS components 10, and, more broadly, the FDMS platform 120. As such, commands issued in any telnet session may need to be routed to the FDMS components 10 that are able to service those commands. The Boot Strapper 36 may request each FDMS component 10 to register commands that it is able to handle with the Telnet Management Interface 15, so that the Telnet Management Interface 15 can route the commands to the appropriate handler.

The Boot Strapper 36 may set the Module Manager 12 as the destination for the data received by the Pub/Sub Manager 16.

The Boot Strapper 36 may set the Notifications Manager 14 as the destination for notifications received by the Module Manager 12 from the various fraud detection modules 23 (shown in FIG. 2).

The Boot Strapper 36 may set the Case/ML Manager 20 as the destination for the API requests received by the REST API server 17.

Figure 4:
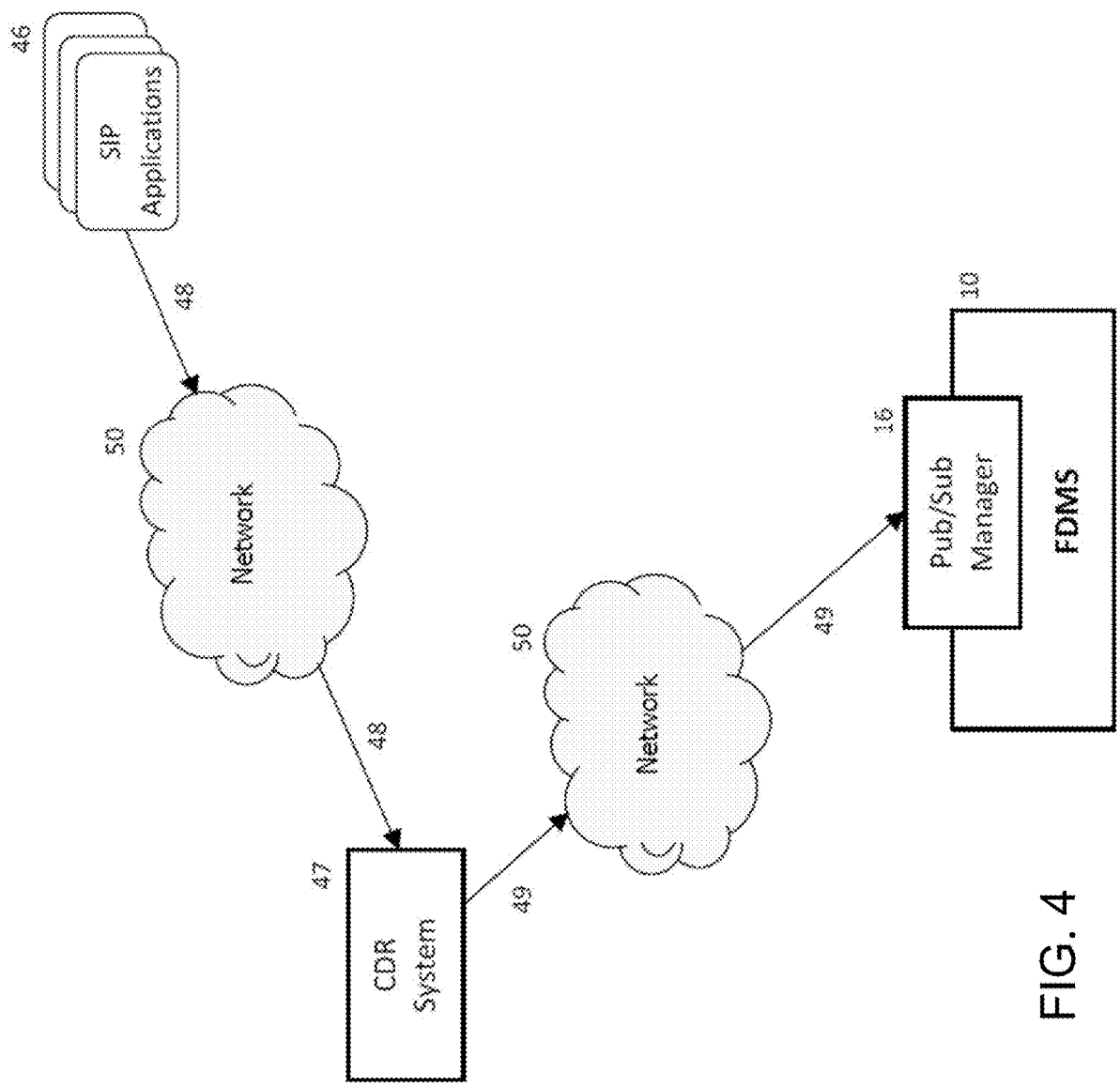
FIG. 4 shows an example of an implementation of a Pub/Sub Manager that may be included in the communication system of FIG. 1.

FIG. 4 shows an example of an implementation of the Pub/Sub Manager 16 in the FDMS components 10, and, more broadly, in the FDMS platform 120 (shown in FIG. 1). This implementation may include one or more session initiation protocol (SIP) applications, a CDR System 47, and the Pub/Sub Manager 16, all of which may be communicatively coupled via the network 50. The source of all call related data may be SIP Applications 46. The SIP Applications 46 may generate CDR events at various times during a call flow and send those events to the CDR System 47. The SIP Applications 46 may send data signals 48, which may include CDR events data, to the CDR System 47.

In addition to call life cycle events, the data signal 48 may include application flow events, events generated by one or more digital signal processors (DSPs) within the SIP Applications 46, or the like. The one or more DSPs within the SIP Applications 46 may include, for example, DSPs dealing with call quality measurements, voice prints, prosodic metrics, or the like.

The CDR System 47 may include a set of processes that receive, parse, organize, and transform the received data signals 48, which may include large numbers of different types of events emitted by the multitude of the SIP Applications 46 running in the FDMS platform 120 into call detail records (CDR).

The CDR System 47 may have the capability of acting as a data server and allowing other applications in the FDMS components 10 (or FDMS platform 120, shown in FIG. 1) to subscribe to custom streams of data. These data streams can be configured by each network application client to contain selected raw data that has been received by the CDR System 47 or selected processed data (CDR records) or any combination of those. These data streams may then be delivered by the CDR System 47 using dedicated data streams to each subscriber application. The FDMS platform 120 may use this subscription mechanism to subscribe to the raw data events sent by the SIP Applications 46 to the CDR System 47. The CDR System 47 may send data signals 49 to the Pub/Sub Manager 16, for example, over the network 50. The data signals 49 may be received by the Pub/Sub Manager 16 within the FDMS platform 120, and routed by the Pub/Sub Manager 16 to the Module Manager 12.

The data signals 48, 49 (including CDR data) may flow over the network 50 through, for example, TCP socket connections.

Figure 5:
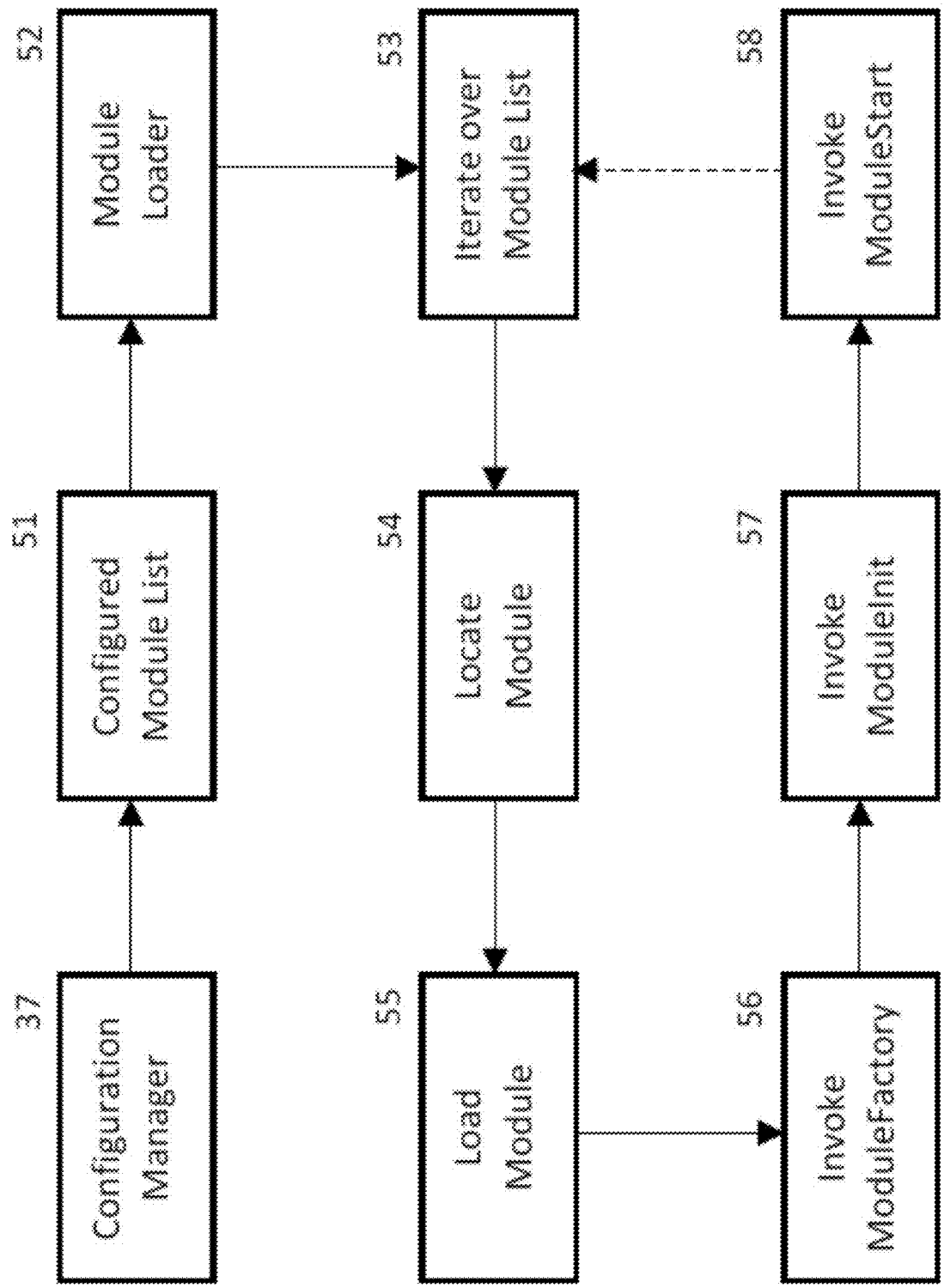
FIG. 5 shows an example of an operation that may be carried out by a Module Manager that may be included in the communication system of FIG. 1.

FIG. 5 shows a flow diagram of an example of an operation that may be carried out by the Module Manager 12 in the FDMS components 10, and, more broadly, in the FDMS platform 120 (shown in FIG. 1).

Referring to FIGS. 2, 3, and 5, the Module Manager 12 may initially communicate with the Configuration Manager 37 and retrieve a configured module list 51 from the Configuration Manager 37, which may be globally accessible in the FDMS platform 120. The configured module list 51 may include identification of all available fraud detection modules 23 in the FDMS platform 120. The configured module list 51 may be contained in the Configuration Manager 37.

The list 51 of the configured fraud detection modules 23 may then be taken up by a Module Loader 52 within the Module Manager 12. The Module Loader 52 may iterate (53) through the list 51 of the configured fraud detection modules 23, performing a sequence of steps on each item in the list 51.

Using the configuration data, a Shared Module (not shown) may be located in the FDMS platform 120 (54). The Shared Module may then be dynamically loaded into the FDMS platform 120 process space (55).

An address of a ModuleFactory computer program routine may be found within the Shared Module and invoked to yield an instance of an FDMS platform 120 compatible fraud detection module 23 (53). A ModuleInit computer program routine of the instantiated module object may then be invoked (57) to allow each module 23 to read its own configuration file using the Configuration Manager 37. Each module 23 may initialize itself based on its specific configuration in the Configuration Manager 37.

A ModuleStart computer program routine of the self-configured module object may then be invoked (58). This may initiate the main thread of the module 23 that may be dedicated to processing the messages and data received from the Module Manager 12. The module 23 may be free to spawn any additional threads that it may require.

Figure 6:
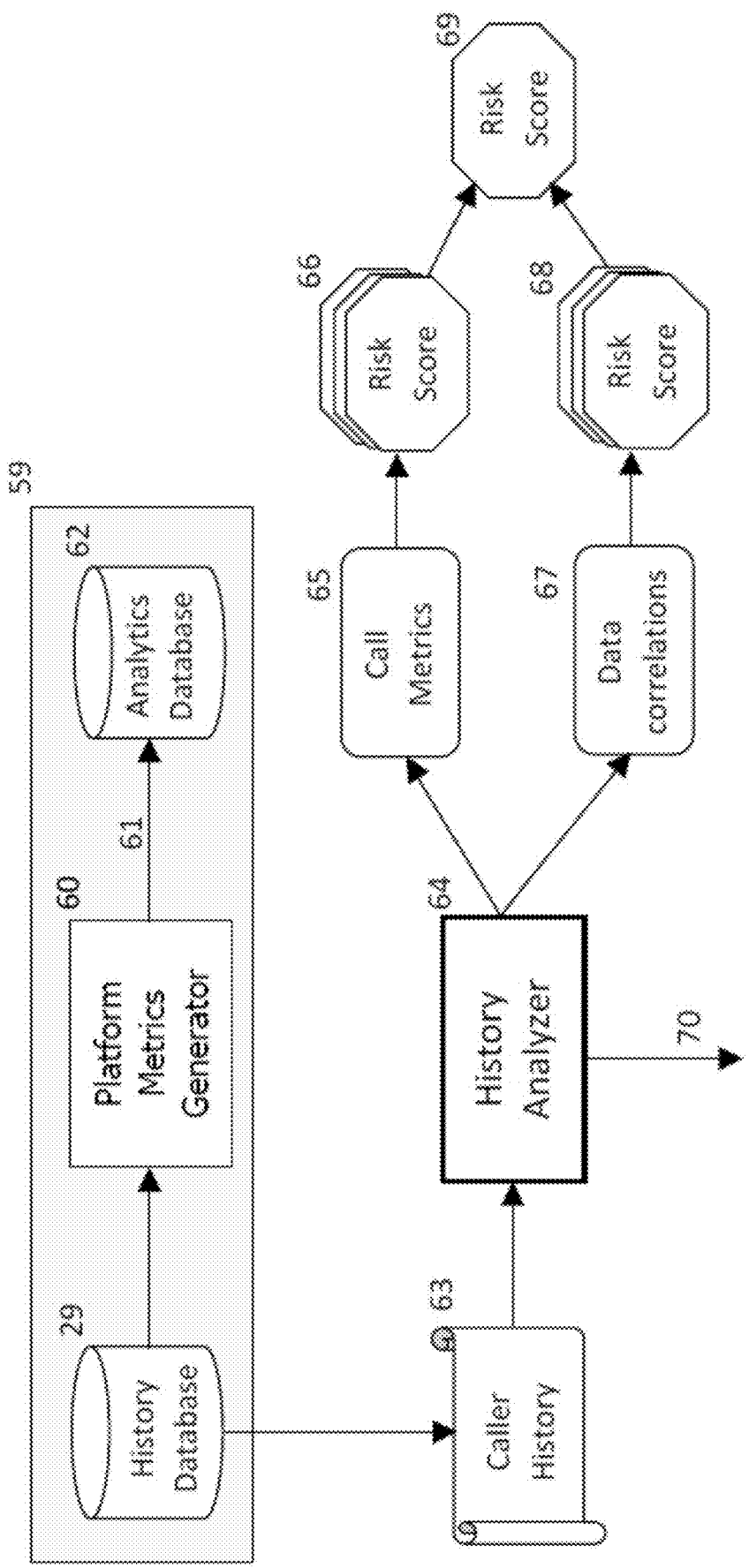
FIG. 6 shows an example of an operation that may be carried out by a Call Detail Records Analytics Module that may be included in the communication system of FIG. 1.

FIG. 6 shows an example of a flow diagram of the CDR Analytics Module 24 (shown in FIG. 2) that may be implemented in the FDMS platform 120, according to the principles of the disclosure. The CDR Analytics Module 24 may include a Platform Metrics Generator 60, an Analytics Database 62, and a History Analyzer 64.

As seen in FIG. 6, the functioning of the CDR Analytics Module 24 may require a pre-requisite batch processing of the historical data for all the callers, so that a platform level view may be obtained regarding various call metrics. This batch process may be run by the FDMS platform 120 to generate the platform metrics at periodic intervals such as, for example, hourly, daily, weekly, monthly, quarterly, annually, or the like.

For instance, CDR data may be batch-loaded from the history database 29 and/or CDR database 30 (shown in FIG. 2) by the CDR Analytics Module 24. The Platform Metrics Generator 60 may process the entire caller history (e.g., for the past year) to generate overall platform metrics. The generated metrics may include, for example, mean, median, percentiles, standard deviation, and the like, for various metrics, such as the number of calls made per caller, the total time spent by a caller on the platform, the total number of applications accessed by a caller, and the like. The Platform Metrics Generator 60 may create an analytics record 61 for each metric and forward the analytics records 61 to the Analytics Database 62.

The latest set of analytics records 61 generated by the Platform Metrics Generator 62 may be flagged as active in the Analytics Database 62. The old analytics records may be retained, but need not be used by the CDR Analytics Module 24.

When a new call is received by the FDMS platform 120, the caller number presented in the call may be used to retrieve the caller history from the history database 29 (shown in FIG. 2).

The History Analyzer 64 may retrieve caller history 63 from the history database 29, which may be done in two distinct passes. The first pass may look at the call metrics generated for the caller through the processing of the caller history and compare those metrics to the overall platform metrics. Each metric may be compared individually and each such comparison may generate a risk score that reflects the divergence of that metric when compared to the overall corresponding platform metric. The individual risk score values may then be combined through a weighting mechanism that results in an overall risk score that is based on all the call metric comparisons.

The second pass may look at the consistency of the metadata across all the calls in the caller history. A number of heuristics may be used in this pass to evaluate the consistency of metadata against expectations. For example, if the originating line identification (OLI) values in the individual calls indicate that the device type being used by the caller for making calls is a landline, then, the expectation may be that the Jurisdiction Information Parameter (JIP), which indicates the public switched telephone network (PSTN) switch location, would remain constant and not vary across the different calls. Each heuristic that is applicable to the caller's history may be applied and yield a metadata correlation risk score. The set of all metadata correlation risk scores may then be combined through a weighting mechanism that results in an overall risk score that is based on all the applicable metadata correlations.

The call metrics risk score and the metadata correlations risk score may be combined into a single risk score that reflects the overall risk assessment of the CDR Analytics Module 24 for the current call. The assessed risk score may be sent to the Notifications Manager 14 (shown in FIG. 2) along with details of the assessment. The assessment may contain a normalized feature representation of the call from the point of view of the CDR Analytics Module 24, which may be used later for predictive analytics.

Figure 7:
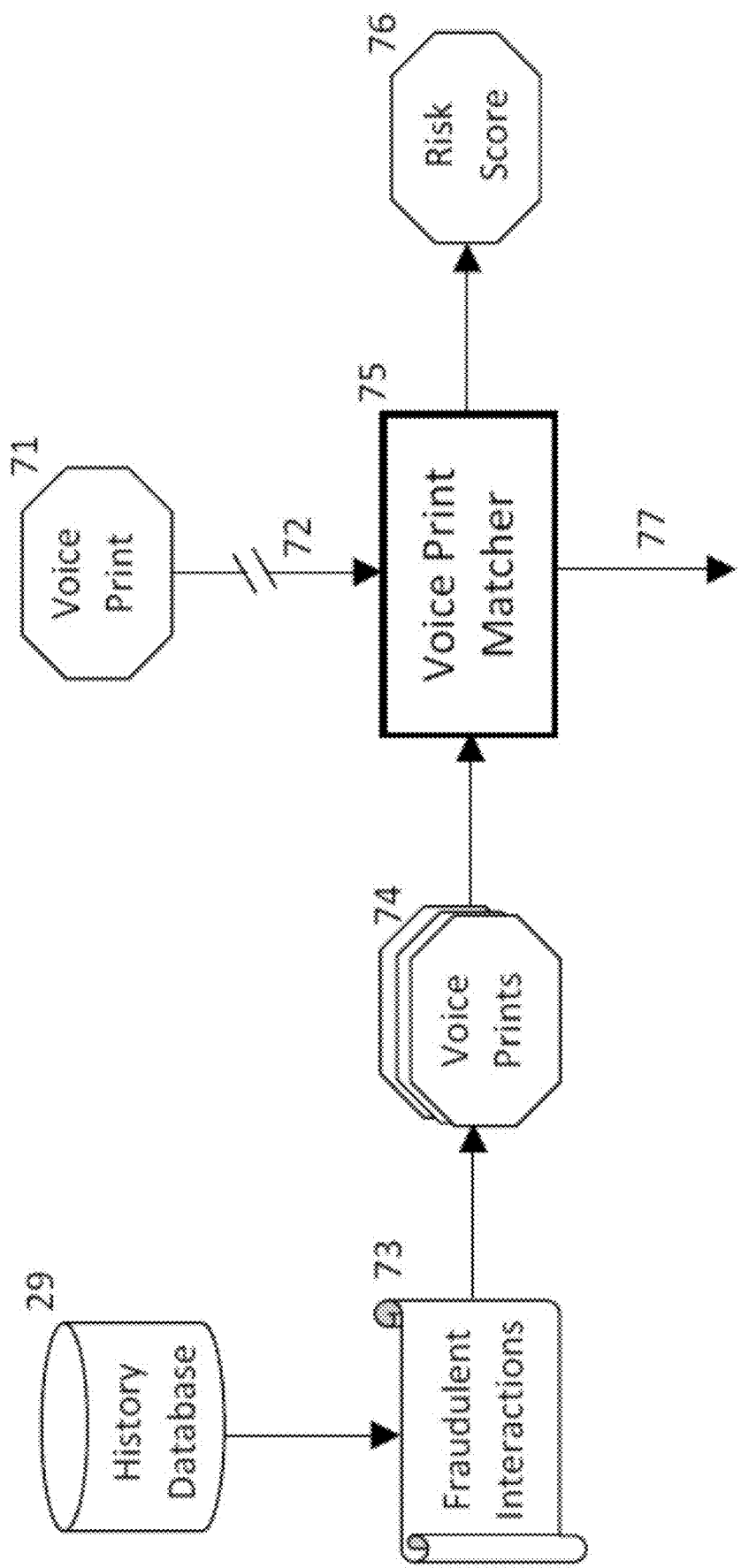
FIG. 7 shows an example of an operation that may be carried out by a Voice Print Module that may be included in the communication system of FIG. 1.

FIG. 7 shows an example of a process flow of the Voice Print Module 25 in the FDMS platform 120, according to the principles of the disclosure. The Voice Print Module 25 may include a Voice Print Matcher 75.

Referring to FIG. 7, for every inbound call that is processed by an IVR where the caller submits a speech input, or where the caller is transferred to a call center 130 agent and starts to speak to the agent, the digital signal processing components (not shown) of the FDMS platform 120 compute a voice print 71, which may then be sent (e.g., by means of the CDR event dispatch mechanism) to the CDR System 47 (shown in FIG. 4). The voice print event may be received at the CDR System 47 and, more particularly received by the FDMS platform 120 through the CDR data stream 49 (shown in FIG. 4), which is received by the Pub/Sub Manager 16. The data event may then be sent to the Module Manager 12, which may route the event to the Voice Print Module 25.

Referring to FIG. 7, the Voice Print Module 25 may query and retrieve all history records across all callers from the history database 29 where the callers' interaction was flagged as fraudulent (73). One of the fields within the history records contains the value that indicates whether that specific interaction was later identified as fraudulent. The percentage of history records with the fraud flag set is likely to be a very small number, such as, for example, less than 0.0001%, based on call volumes. The fact that a call is identified as fraudulent may be considered to be part of a caller's history. The retrieved history records may include voice prints, or voice prints may be generated in real-time by processing the voice data in the retrieved history records to provide voice prints 74 for each of the retrieved history records.

The voice print values from the query results may be collected for processing and temporarily stored in a local memory (not shown). Any duplicate prints may be removed from the temporary collection. The Voice Print Matcher 75 iterates over the known fraudulent voice prints 74, which are known to the FDMS platform 120, and compares the voice prints 74 to the current call voice print 71 to determine a likelihood of a match between the current voice print 71 to any of the voice prints 74 in the query results. In a production environment, the query results may be cached in memory using a data structure that allows rapid matching of the voice print 71. The cache within the memory would be updated whenever any history record within the history database 29 is created or updated with the fraud indicator flag set to TRUE.

Depending on the confidence with which such a match is made, the Voice Print Matcher 75 computes a final risk score 76 for the current call, and sends the assessed risk score 77 to the Notifications Manager 14 (shown in FIG. 2) along with details of the assessment.

Figure 8:
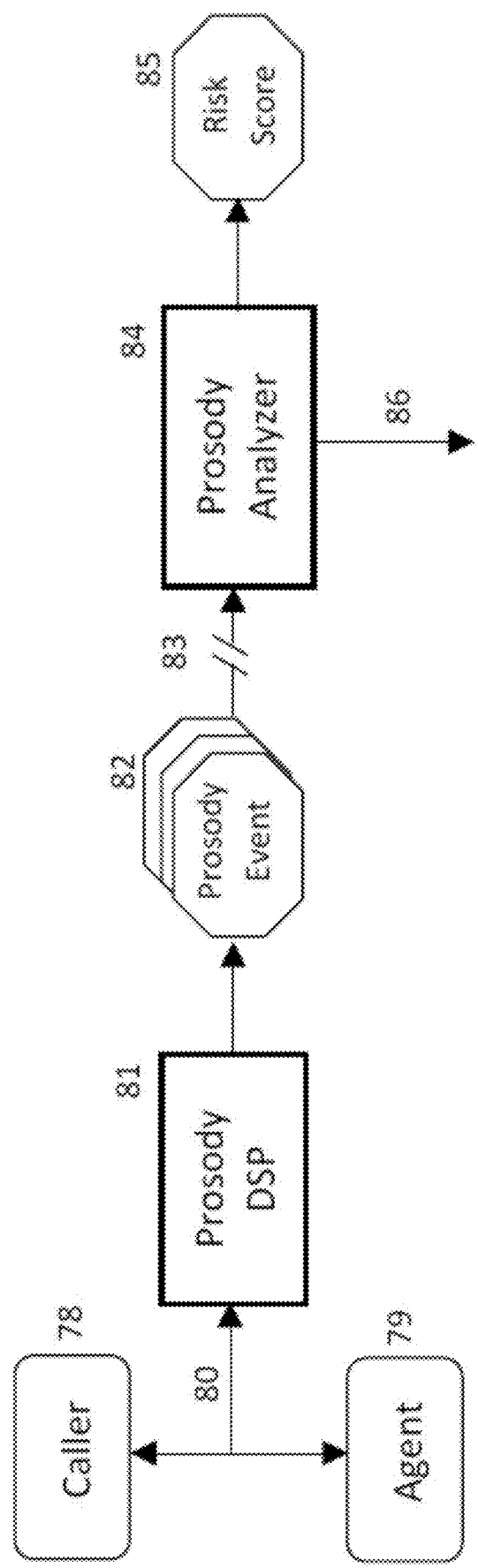
FIG. 8 shows an example of an operation that may be carried out by a Prosody Module that may be included in the communication system of FIG. 1.

FIG. 8 shows an example of an operation that may be carried out by the Prosody Module 26, according to the principles of the disclosure. The Prosody Module 26 may include one or more Prosody digital signal processors (DSPs) 81 and a Prosody Analyzer 84.

Referring to FIGS. 1 and 8, an inbound call from a caller 78 using a communications device 110 may be transferred from the IVR (not shown) to an agent 79 at the call center 130. The caller 78 may be placed on hold until the agent 79 becomes available. The call center 130 agent 79 may answer the call, when the agent becomes available to attend to the next caller who is waiting to speak to, for example, a customer support person. The ensuing discourse between the caller 78 and the agent 79 results in a call signal 80 that contains acoustic cues that reveal the communicative intentions of the caller 78 and the agent 79—via, for example, their vocal emotions. Emotions may include anger, fear, happiness, surprise, sadness, disgust, and the like. The acoustic cues may comprise various features such as a mean pitch, mean amplitude, pitch range, range intensity, and the like.

The Prosody DSP 81 may receive the call signal 80 and process the acoustic cues in the received call signal into information that can be consumed by other processors to derive any needed inferences. The information may be packaged into CDR events, which may be sent to the CDR System 47 (shown in FIG. 4) using the CDR event dispatch mechanism 49.

Referring to FIGS. 2 and 4, the CDR events may be sent by the CDR System 47 to the FDMS components 10 through the CDR data stream 49. As seen, the CDR data stream 49 may be received by the Pub/Sub Manager 16. The events may then be sent to the Module Manager 12, which may route the events to the Prosody Module 26.

Referring to FIG. 8, the Prosody Analyzer 84, within the Prosody Module 26, may accumulate these events for each call until such time as the sequence of cues is sufficiently conclusive enough to arrive at a decision point. The Prosody Analyzer 84 may implement one or more heuristics to detect whether the agent 79 is being socially engineered. For instance, the Prosody Analyzer 84 may look for situations where the caller 78 is relatively calm while the agent 79 is emotionally stressed and continues to become increasingly stressed with time. Other situations, such as where the caller 78 is stressed, or both the agent 79 and the caller 78 are stressed, may be deemed to be situations where social engineering is not evident. The Prosody Analyzer 84 may implement various other heuristics such as these to detect the practice of social engineering by the call 79, who may be a fraudster. Prosodic measurement and analyses of the behavioral dynamics of conversation in real-time are described in U.S. Pat. No. 8,897,437, issued on Nov. 25, 2014 and titled "Method and system for improving call-participant behavior through game mechanics," which is hereby incorporated by reference in its entirety. Additional techniques for evaluating voice signals in a real-time audio signal may be used, such as, for example, the techniques described in U.S. Pat. No. 9,031,838, issued on May 12, 2015 and titled "Method and apparatus for voice clarity and speech intelligibility detection and correction," the disclosure of which is hereby expressly incorporated herein by reference in its entirety.

The Prosody Analyzer 84 emits a risk score 85 when the analysis is conclusive enough to compute a fraud risk score with sufficient confidence. The assessed risk score 86 may then be sent to the Notifications Manager 14 (shown in FIG. 2) along with details of the assessment. The assessment may contain a normalized feature representation of the call from a point of view of the Prosody Module 26, which may be used later for predictive analytics.

Figure 9:
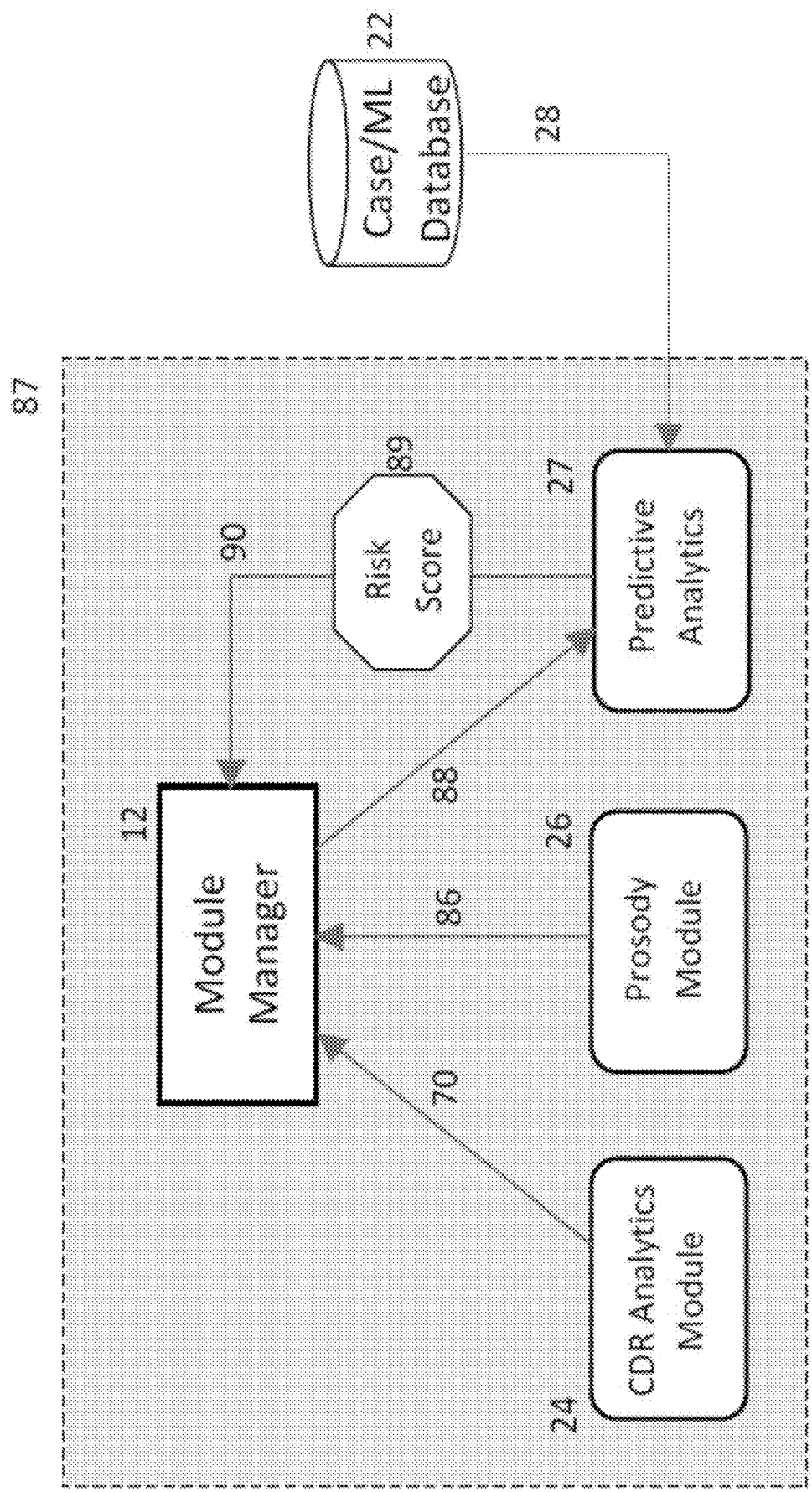
FIG. 9 shows an example of an operation that may be carried by a Predictive Analytics Module that may be included in the communication system of FIG. 1.

FIG. 9 shows an example of an operation carried out by the Predictive Analytics Module 27, according to the principles of the disclosure.

Unlike the other modules 23 within the FDMS platform 120, which may depend on the platform events arriving via the call data stream 49 (shown in FIG. 4) provided by the CDR System 47 (shown in FIG. 4), the Predictive Analytics Module 27 may depend entirely on the data provided by the other fraud detection modules 23 within the FDMS platform 120. For instance, the Predictive Analytics Module 27 may depend on the feature vectors contained in the risk assessment dispositions 70, 86 sent out by the CDR Analytics Module 24 and the Prosody Module 26 to the Notifications Manager 14 via the Module Manager 12. The Module Manager 12, serving as a data hub for the various modules 23 for incoming data and outgoing dispositions 70, 86, 88, can provide a copy of the outgoing dispositions 70, 86 from the CDR Analytics Module 24 and the Prosody Module 26 to the Predictive Analytics Module 27.

The Predictive Analytics Module 27 may not need to use the dispositions from the Voice Print Module 25 (shown in FIG. 2), and may not need to subscribe to the dispositions originating from that module. The Predictive Analytics Module 27 may implement the feature vectors contained in the dispositions 70, 86 from the CDR Analytics Module 24 and the Prosody Module 26, as well as the Fraud Detection Model 28 drawn from the Case/ML database 22 to compute (89) a fraud risk score 90. The assessed risk score 90 may then be sent to the Notifications Manager 14 via Module Manager 12.

Figure 10:
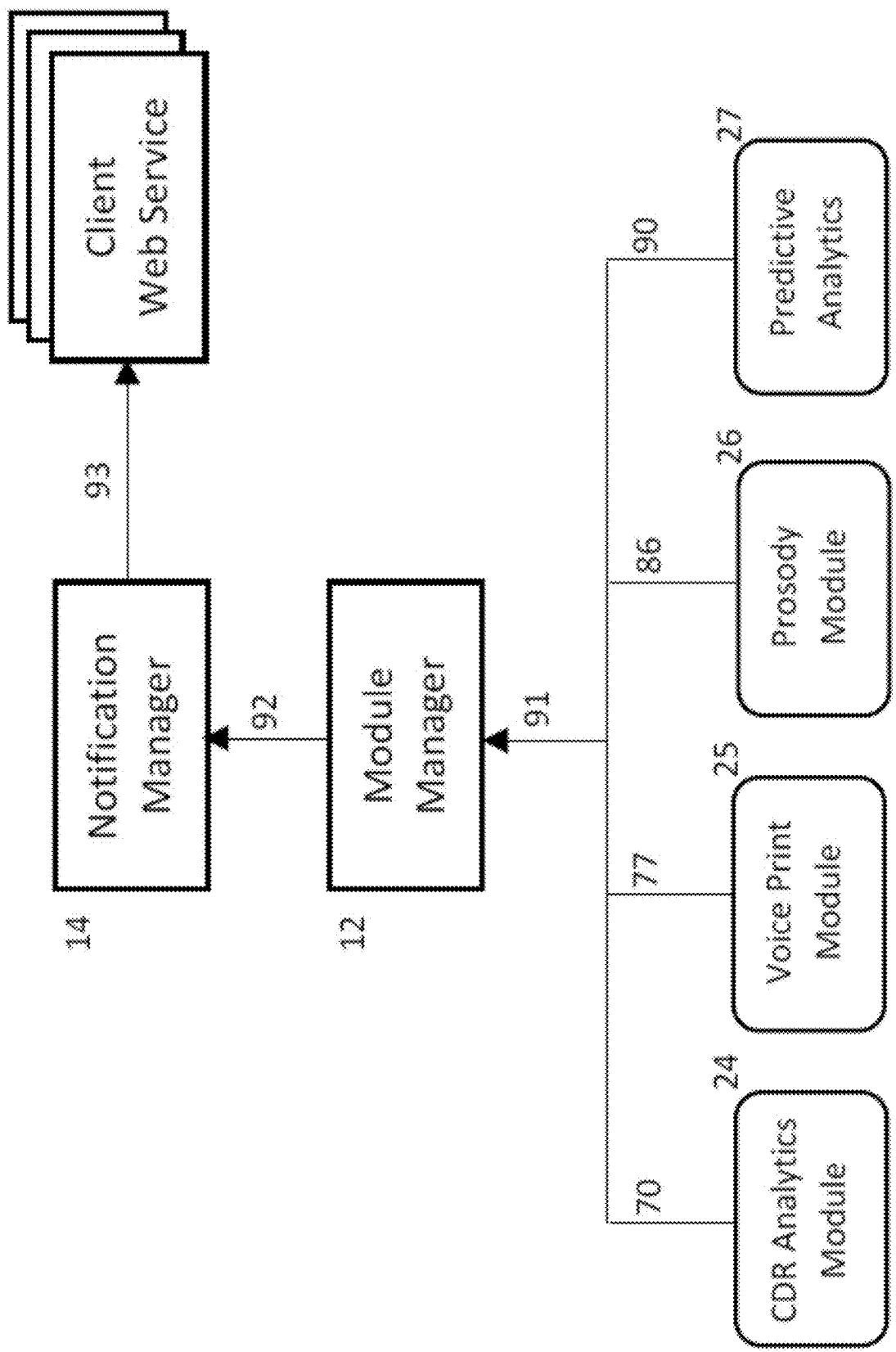
FIG. 10 shows an example of a Notifications Module that may be included in the fraud detection and management system platform of FIG. 2.

FIG. 10 shows an example of an operation that may be carried out by the Notification Module 14, according to the principles of the disclosure. As seen in FIG. 1, individual risk assessment dispositions 70, 77, 86, and/or 90 may be sent from the various fraud detection modules 23 to the Module Manager 12, since the fraud detection modules 23 may be configured to only communicate with the Module Manager 12 and no other component within the FDMS platform 120.

The Module Manager 12 may receive a risk assessment disposition 91 from the fraud detection modules 23, which may include the risk assessment dispositions 70, 77, 86, and/or 90. The Module Manager 12 may proxy the received risk assessment disposition 91 and send a risk assessment disposition 92 to the Notifications Manager 14.

The Notifications Manager 14 may maintain a mapping of each caller interaction to the collection of all risk assessment dispositions 92 received for that call from the various fraud detection modules 23. The Notifications Manager 14 may retain only the last received risk assessment disposition 92 for each fraud detection module 23 (for reach call). All of the available risk assessment dispositions 92 may be merged into a single risk assessment disposition by the Notifications Manager 14, representing the latest fraud assessment for that call. This combined risk assessment disposition may then be converted to a request signal 93, which may include an HTTP POST request, by the Notifications Manager 14. The request signal 93 may then be sent to the appropriate customer call back web service (e.g., a call back Uniform Resource Locator (URL)). The call back web service (e.g., URL) may be determined based on the application identifier, and the client specification of application identifiers to callback URLs in the system configuration in the FDMS platform 120.

Figure 11:
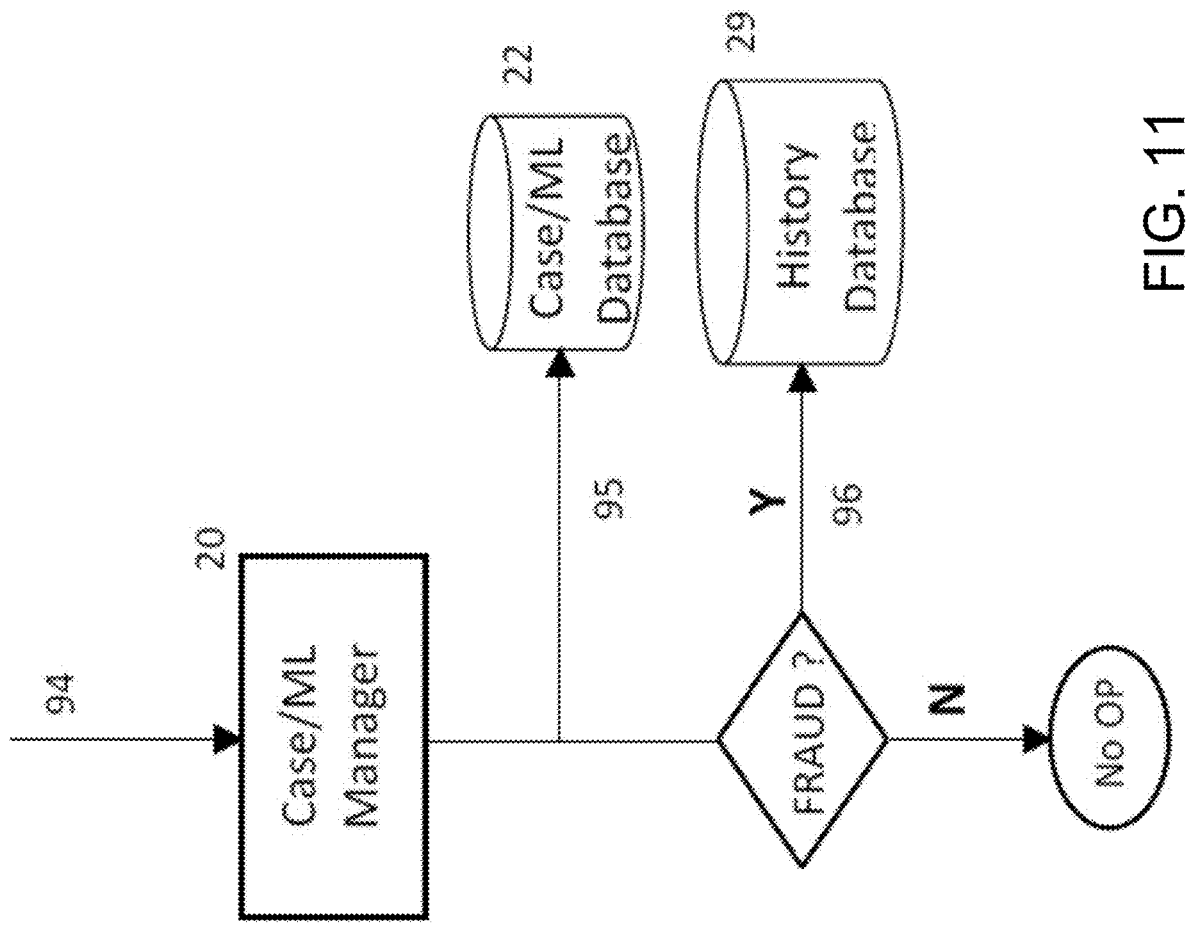
FIG. 11 shows an example of an operation that may be carried out by a Case/ML Manager that may be included in the communication system of FIG. 1.

FIG. 11 shows an example of an operation carried out by the Case/ML Manager 20, according to the principles of the disclosure.

Referring to FIGS. 2 and 11, a fraud feedback loop from the clients may allow the client applications or web services to invoke REST APIs provided by the REST API Server 17. The REST API Server 17 may authenticate the request 18 from a client application or web service and forward a request 94 to the Case/ML Manager 20. The request 94 can be one of Create, Update, or Close.

A Create request 95 may cause a new case record to be created in the Case/ML database 22. An Update request 95 may add new details pertinent to the suspected fraud case. A Close request 95 may supply a final determination of fraud.

A Close request 95 may indicate to the FDMS platform 120 whether this specific case (and by implication, the call involved) is a True Positive, True Negative, False Positive, or a False Negative. Regardless of the outcome, the confusion matrix in the Case/ML database 22 may be updated so that the FDMS platform 120 can keep track of the effectiveness of its fraud model.

When fraud is confirmed via the feedback loop (96), regardless of whether it is a True Positive or a False Negative, the corresponding history record in the history database 29 is updated to note that the call was finally deemed to be fraudulent.

A "platform," as used in this disclosure, means any computer hardware, software, or combination of hardware and software, including, for example, computer hardware and operating system software.

A "computer," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server," as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database," as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. The at least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication(s) link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G, 4G or 5G cellular standards, Bluetooth, or the like. A communication(s) link may include a public switched telephone network (PSTN) line, a voice-over-Internet-Protocol (VoW) line, a cellular network link, an Internet protocol link, or the like. The Internet protocol may include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like).

A "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which may be configured to communicate data via a wireless and/or a wired communication medium. These networks may run a variety of protocols not limited to TCP/IP, IRC or HTTP.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium may include a "Cloud," which includes a distribution of files across multiple (e.g., thousands of) memory caches on multiple (e.g., thousands of) computers.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A fraud detection and management system (FDMS) that includes a computer or a server and that detects fraud in a call signal received from a caller device during one or more distinct phases of a call lifecycle, the fraud detection management system comprising:
   a controller that initiates and manages operations of a plurality of components in the fraud detection and management system (FDMS);
   a fraud detection module suite that includes a plurality of fraud detection modules, each of which employs a respective fraud detection technology based on the fraud or a phase of the call lifecycle; and
   a module manager that dynamically selects a fraud detection module from the plurality of fraud detection modules based on a phase of the call lifecycle and loads the selected fraud detection module into a platform process space to detect the fraud during said phase of the call lifecycle.

2. The system of claim 1, wherein the fraud detection module suite comprises at least one of: a call detail record (CDR) analytics module that searches anomalous behaviors within a caller history; a voice print module that verifies a voice print of a caller voice signal against one or more voice prints stored in a database; a prosody module that analyzes prosodic features of an interaction between a caller on the caller device and a human agent on a caller agent device; and a predictive analytics module that predicts a fraud risk of the call signal.

3. The system of claim 2, wherein the module manager selects the call detail record (CDR) analytics module to search anomalous behaviors within the caller history associated with metadata in the call signal.

4. The system of claim 2, wherein the module manager selects the voice print module to verify a voice print of the caller voice signal against a plurality of voice prints stored in the database.

5. The system of claim 2, wherein the module manager selects the prosody module to analyze prosodic features of the interaction between the caller on the caller device and the human agent on the caller agent device.

6. The system of claim 2, wherein the module manager selects the predictive analytics module to predict the fraud risk of the call signal.

7. The system of claim 1, wherein an initial risk estimate of fraud in the call signal is determined when the call signal is received, the initial risk estimate of fraud being based on at least one of a call number, a caller history associated with the call number, and a consistency of call metadata correlations of the caller history.

8. The system of claim 1, wherein the system determines whether a recording of the call signal should be made based on a voice print of a caller when the caller interacts with an interactive voice response (IVR).

9. The system of claim 1, wherein the plurality of components comprise a telnet management interface that facilitates loading, unloading, or upgrading one or more of the fraud detection modules.

10. The system of claim 1, wherein the plurality of components comprise a notification manager that receives a fraud notification signal from the fraud detection module suite and dispatches a fraud alert signal to a client server.

11. The system of claim 1, wherein the plurality of components comprise a publication/subscriber manager that receives the call signal and sends call data to the fraud detection module suite.

12. The system of claim 1, wherein the plurality of components comprise a Representation State Transfer (REST) application program interface (API) server that includes a RESTful API that can be invoked by a client server to report detected fraud to the system.

13. The system of claim 1, wherein the plurality of components comprise a case/machine learning manager that includes a plurality of case records that are referenced by the system to assess effectiveness of a current fraud model.

14. The system of claim 1, wherein the controller comprises a boot strapper that instantiates each of the plurality of components.

15. The system of claim 1, wherein the controller comprises a system monitor that monitors each of the plurality of components, and that receives a periodic status report signal from each of the plurality of components.

16. The system of claim 1, wherein the controller comprises a configuration manager that loads and maintains an overall system configuration of the system.

17. A fraud detection and management system (FDMS) that includes a computer or a server and that detects fraud in a call signal received from a caller device during one or more distinct phases of a call lifecycle, the fraud detection management system comprising:
a fraud detection module suite that includes a plurality of fraud detection modules, each of which employs a respective fraud detection technology based on the fraud or a phase of the call lifecycle; and
a module manager that dynamically selects a fraud detection module from the plurality of fraud detection modules based on a phase of the call lifecycle and loads the selected fraud detection module into a platform process space to detect the fraud during said phase of the call lifecycle based on a client risk profile.

18. A method for fraud detection and management, the method comprising:
receiving a call signal from a caller device;
selectively identifying one or more fraud detection modules in a fraud detection module suite based on the call signal;
dynamically loading the selectively identified one or more fraud detection modules in a fraud detection and management system platform process space; and
processing the call signal by the loaded selectively identified one or more fraud detection modules in the fraud detection and management system platform process space to determine a fraud risk score for the call signal.

19. The method of claim 18, further comprising:
retrieving a client risk profile from a database; and
processing the call signal by the selectively identified one or more fraud detection modules based on the client risk profile to determine the fraud risk score for the call signal.

20. The method of claim 18, wherein the selectively identifying the one or more fraud detection modules is based on a stage of a lifecycle of the call signal, including before a call starts, after the call connects, during interactive voice response (IVR), or after connecting the call to a call center agent device.

* * * * *